US 11,952,865 B2

(12) United States Patent
Fripp et al.

(10) Patent No.: US 11,952,865 B2
(45) Date of Patent: Apr. 9, 2024

(54) DOWNHOLE VAPOR-TRANSITION CONTROL VALVE FOR FLUID INJECTION

(71) Applicant: Halliburton Energy Services, Inc., Houston, TX (US)

(72) Inventors: Michael Linley Fripp, Singapore (SG); Fraser Murray, Singapore (SG); Stephen Michael Greci, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 128 days.

(21) Appl. No.: 17/648,972

(22) Filed: Jan. 26, 2022

(65) Prior Publication Data

US 2022/0333460 A1 Oct. 20, 2022

Related U.S. Application Data

(60) Provisional application No. 63/175,117, filed on Apr. 15, 2021.

(51) Int. Cl.
*E21B 34/10* (2006.01)
*E21B 43/16* (2006.01)

(52) U.S. Cl.
CPC .......... *E21B 34/101* (2013.01); *E21B 43/164* (2013.01)

(58) Field of Classification Search
CPC ...... E21B 34/101; E21B 43/164; E21B 34/06; E21B 41/0064; Y02C 20/40
See application file for complete search history.

(56) References Cited

U.S. PATENT DOCUMENTS

| | | | |
|---|---|---|---|
| 7,866,400 B2 | 1/2011 | Steele et al. | |
| 8,096,362 B2 | 1/2012 | Steele et al. | |
| 9,187,991 B2 | 11/2015 | Fripp et al. | |
| 10,119,362 B2 | 11/2018 | Fripp et al. | |
| 2007/0284118 A1 | 12/2007 | Benton | |
| 2010/0288555 A1* | 11/2010 | Foppe | F24T 10/20 175/11 |
| 2012/0003043 A1* | 1/2012 | Cawley | E21B 43/164 405/53 |
| 2012/0145404 A1 | 6/2012 | Schultz et al. | |
| 2013/0192833 A1 | 8/2013 | Gano et al. | |
| 2015/0040990 A1 | 2/2015 | Mathiesen et al. | |
| 2015/0053420 A1* | 2/2015 | Fripp | E21B 34/06 166/373 |

FOREIGN PATENT DOCUMENTS

WO 2013034185 A1 3/2013

OTHER PUBLICATIONS

"PCT Application No. PCT/US2022/070375, International Search Report and Written Opinion", May 10, 2022, 11 pages.

* cited by examiner

*Primary Examiner* — Nicole Coy
*Assistant Examiner* — Nicholas D Wlodarski
(74) *Attorney, Agent, or Firm* — DeLizio, Peacock, Lewin & Guerra, LLP

(57) ABSTRACT

A flow control valve configured to be positioned in a tubing in a borehole formed in a subsurface formation, wherein the flow control is used to regulate a flow of an injection fluid into the subsurface formation based on a vapor-transition characteristic of a fluid contained within a chamber of the flow control valve.

12 Claims, 9 Drawing Sheets

US 11,952,865 B2

DOWNHOLE VAPOR-TRANSITION CONTROL VALVE FOR FLUID INJECTION

RELATED APPLICATION

This application claims the benefit of priority to U.S. Provisional Patent Application Ser. No. 63/175,117, filed Apr. 15, 2021, which is incorporated by reference herein in its entirety.

TECHNICAL FIELD

The present disclosure relates generally to wellbore operations, and, more particularly to various embodiments of control valves utilized for controlling fluid injection into subsurface formations.

BACKGROUND

Various subterranean reservoirs, such as wellbores, wellbore networks, and underground spaces such as rock formation material or a subterranean cavity, may be used to store various types of liquids and gases. For example, some subterranean reservoirs may be used for carbon dioxide ($CO_2$) sequestration, which for example may be utilized to secure a space for permanent disposal of $CO_2$ based on meeting various environmental/governmental regulations regarding the handling of $CO_2$. In other examples, a reusable resource, such as hydrogen, may be stored on a temporary basis in a subterranean reservoir, and recovered at a later time for use as needed.

BRIEF DESCRIPTION OF THE DRAWINGS

Embodiments of the disclosure may be better understood by referencing the accompanying drawings.

Figure 1A:
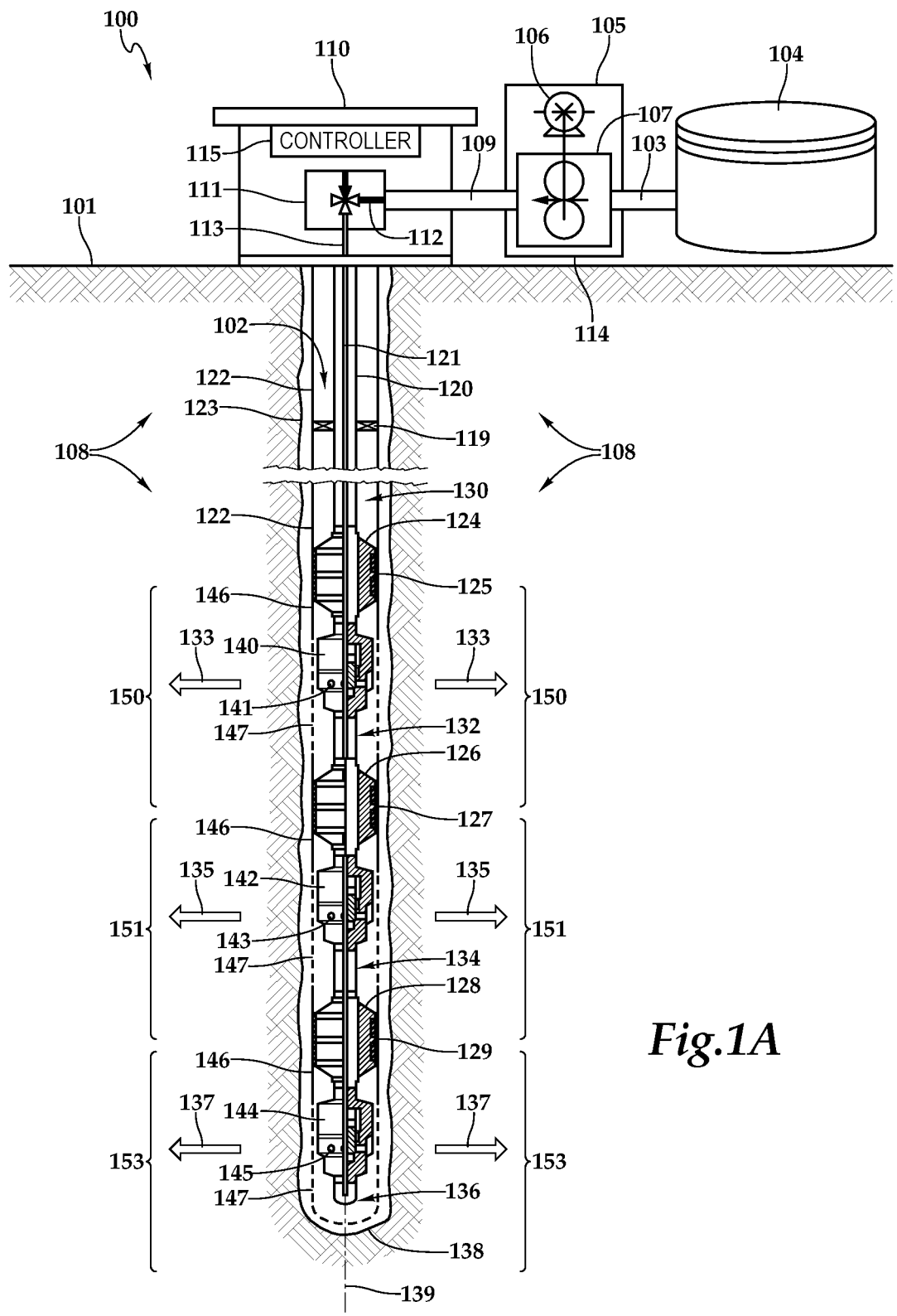
FIG. 1A illustrates a diagram of a wellbore system configured for fluid injection into a subterranean formation, according to various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DETAILED DESCRIPTION

The description that follows includes example systems, methods, techniques, and program flows that embody aspects of the disclosure. However, it is understood that this disclosure may be practiced without these specific details. For instance, this disclosure refers to use of carbon dioxide ($CO_2$) and hydrogen ($H_2$) in illustrative examples. Aspects of this disclosure can also use other types of gases. In other instances, well-known instruction instances, protocols, structures and techniques have not been shown in detail in order not to obfuscate the description.

Example embodiments can be used as part of $CO_2$ sequestration in the subsurface formation. In some embodiments, a valve is positioned to restrict injection of $CO_2$ when the $CO_2$ is low-density phase state, (e.g., a gas), and minimally restrict injection when the $CO_2$ is high-density phase state, (e.g., a liquid). Other example embodiments may be used for storage of hydrogen that can be an energy storage option, in some embodiments where hydrogen can be injected and produced from a same wellbore. Some embodiments can include a spring regulated vapor-transition flow control valve that allows injecting of carbon dioxide in some embodiments, or hydrogen in other embodiments, into a formation or cavity. The vapor-transition flow control valve can ensure that the injected fluid is a desired phase state, such as a liquid or high density fluid, by allowing a flow of the fluid to be injected through or past the valve only when the fluid is provided to the valve in the desired phase state, while blocking the flow of the fluid through the valve when the fluid to be injected into the formation or cavity is not provided to the valve in the desired phase state. This can be important to ensure that the flow velocities of the injected fluid are low, that control of the reservoir is maintained, and that a consistent flow distribution of the injected fluid is achieved in the wellbore.

Example embodiments can include a bellows or piston-operated valve driven by a phase changing of a fluid contained within a closed chamber of the valve, (referred to as piston fluid or as a fill fluid). The bellows or piston-operated valve is configured to be deployed in a borehole formed in a subterranean formation. For example, the valve can be integrated with production tubing that is positioned in the borehole as part of downhole operations. When the injection pressure of the fluid to be injected into the formation or cavity is high, the fill fluid included in the valve can be compressed and transition into a high density fluid phase state, thereby contracting the bellows or retracting a piston, and actuating the valve to an "open" configuration. With the valve in the "open" configuration, injection fluid provided to valve is allowed to pass the valve and be injected into the subterranean formation. When the injection pressure of the fluid to be injected into the formation or cavity is low, the fill fluid included in the valve can be less compressed, and transition into a low density fluid phase state, thereby expanding the bellows or extending a piston, and actuating the valve to a "closed" configuration. With the valve in the "closed" configuration, injection fluid provided to the valve is blocked from passing through or around the valve, and thereby is blocked from being injected into the subterranean formation. Likewise, fluid already contained within the formation is prevented from flowing into the tubing. In some embodiments, the piston fluid or fill fluid used in the vapor-transition flow control valves is selected to have a same (or a substantially similar) vaporization curve as compared to the fluid to be injected into the formation or cavity where the valve is being employed. In some embodiments, the piston fluid or fill fluid and the fluid to be injected can be defined as "substantially similar" if a variation in their vaporization curves is within a threshold. For example, the piston fluid or fill fluid and the fluid to be injected can be defined as substantially similar if a variation in their vaporization curves is less than 1%, 5%, 10%, 25%, etc. In some embodiments, the piston fluid or fill fluid and the fluid to be injected can be defined as substantially similar if the difference in their vapor transition is less than a threshold. For example, the piston fluid or the fill fluid and the fluid to be injected can be defined as substantially similar if the difference in their vapor transition is within 100 pounds per square inch (psi), 50 psi, 200 psi, etc.

In some embodiments, the piston fluid or fill fluid and the fluid to be injected can be defined as the same or substantially similar based on their chemical composition. For example, the piston fluid or fill fluid and the fluid to be injected can have the same chemical composition, for example, both are carbon dioxide, or both are hydrogen. In some embodiments, the piston fluid or fill fluid and the fluid to be injected can be defined as substantially similar if the difference in their chemical composition is less than a threshold. For example, the piston fluid or fill fluid and the fluid to be injected can be defined as substantially similar if the difference in their chemical composition is less than 1%, 5%, 10%, 25%, etc.

In some embodiments, the fill fluid or piston fluid can be an azeotrope fluid. The azeotrope fluid in the bellows or a piston chamber of a vapor-transition flow control valve may be a combination of fluids such that their transition temperature of the combined azeotrope fluids will be at a slightly lower temperature or a slightly higher temperature of the injection fluid, and/or having a slightly lower pressure or slightly higher pressure than the injection fluid that is to be controlled using the valve. In some embodiments, the fill fluid or piston fluid can be at the same pressure as the fluid to be injected into the formation. In such embodiments, the phase change in the piston fluid occurs at the same time as the injected gas within the tubing.

In some embodiments, the term "liquified" and "gaseous" can be used to describe the different phases of gas. Above the critical point, the gas is considered to be a supercritical fluid. Thus, the volume change can be used to create a valve that closes if the injection pressure is insufficient to inject a high-density fluid. As used in this disclosure, a "high density fluid" is any fluid at a temperature and pressure above its critical point or in its liquid form, and a "low density fluid" is any fluid in its vapour or gaseous phase with temperature and pressure below its critical point.

Also, while described in reference to being positioned in a production tubing for fluid injection into the subsurface formation, in some other embodiments, the valve can be used in other downhole configurations and applications. For example, the valve can be positioned in the well using traditional intervention techniques for fluid injection into the subsurface formation. In another example, such valves can be used axially along the borehole where they are installed using bridge plugs or lock mandrels to manage different zones into which fluid can flow.

Additionally, in some embodiments, a system can include multiple valves positioned at different locations (e.g., different depth locations within the wellbore). In some embodiments, one or more of these valves can have independent flow paths for injection into the formation. In some embodiments, one or more of these valves may have different vaporization transitions. In some embodiments, multiple valves can be installed into a single device at a given location along the wellbore. The valves can be configured differently so that the number of open and closed valves can be a function of downhole conditions at the device, which in turn is a function of surface injection conditions. Such embodiments can regulate flow when surface injection conditions are varied. Similarly, in some embodiments, multiple devices can be positioned axially along the wellbore with a same or different configuration.

While described in reference to a phase valve, example embodiments can use any type of flow restriction in order to ensure that the injection fluid is in a high density fluid phase. Examples of flow restrictors that can be used include an inflow control device (ICD) (such as a nozzle, venturi, porous media, or tube), an autonomous inflow control device (AICD), autonomous inflow control device (AICV), a wireless smart well node, etc. In some embodiments, the injected fluid is achieving critical flow by moving at a sonic velocity with the flow restriction.

FIG. 1A illustrates a diagram of a wellbore system 100 configured for fluid injection into a subterranean formation, according to various embodiments. Although described below with respect to a wellbore system configured to perform fluid injection of carbon dioxide into a formation, embodiments of the wellbore system (system 100) are not limited to operations involving carbon dioxide injection, and may include fluid injection operations including other types of gases having various chemical compositions. As shown in FIG. 1A, various components including a storage reservoir or vessel 104, a fluid pump 105, and a wellhead 110 are located above a surface 101, and proximate a wellbore 102 extending below surface 101 into a formation 108. Vessel 104 may be any type of vessel configured to contain the carbon dioxide that is to be injected into formation 108 using system 100 for permanent storage of the carbon dioxide in the formation. The use of the phrase "permanent storge" is not necessarily in reference to a particular timeframe, but refers to storage of the carbon dioxide without the intent to retrieve the carbon dioxide from the formation at some time in the future. The carbon dioxide contained in vessel 104 may have been produced from an oil and gas reservoir, generated for example as a result of a manufacturing process, or from some other man-made source, and was captured and placed in vessel 104 as an alternative to letting the carbon dioxide be emitted into the atmosphere. System 100 is configured to take the carbon dioxide contained in vessel 104, and to inject the carbon dioxide into formation 108 for permanent storage within the formation, as further described below.

As illustrated in FIG. 1, vessel 104 is coupled to fluid pump 105 through fluid conduit 103, wherein fluid pump 105 is coupled to wellhead 110 through fluid conduit 109. In various embodiments, fluid pump 105 includes pump 107 configured to pump carbon dioxide provided through fluid conduit 103 to the wellhead 110 through fluid conduit 109. In various embodiments, pump 107 is powered by a pump driver, such as motor 106, which in various embodiments is an electric motor. The carbon dioxide provided to wellhead 110 is coupled through valve inlet 112 to one or more valves 111 configured to controllably couple a flow of fluid from the valve inlet 112 to the valve outlet 113. A controller 115, which may comprise a computing device with one or more processors and other computing devices, such a computer memory, may be coupled to devices such as the one or more valves 111, and is configured to control the operation of the one or more valves 111. In various embodiments, controller 115 may also be configured to control the operation of the fluid pump 105 in order to regulate the pressure and/or the flow rate of carbon dioxide being provided to the wellhead 110 from vessel 104. In various embodiments, fluid pump 105 may further include temperature control devices 114, which may include heating elements and/or a chiller/compressor unit configured to heat or cool, respectively, the fluid being provided to the wellhead 110, via heating and/or cooling. Heating or cooling of the fluid, in conjunction with the use of pump 105 to pressurize the fluid, may be controlled, in some embodiments by controller 115, in order to place the fluid into a desired and predetermined phase state for injection into the formation 108.

In system 100, valve outlet 113 is coupled to be in fluid communication with a downhole fluid tubing (tubing) 121, which extends down into wellbore 102 is enclosed within a tubing string 120. Tubing string 120 includes a hollow center passageway through which downhole fluid tubing 121 extends. Tubing string 120 is also physically coupled to one or more packers and to one or more flow control valve assemblies, which tubing string 120 helps secure within the wellbore 102. As shown for system 100, tubing string 120 extends from surface 101, and is positioned within and is encircled by upper casing 122, which also extends from surface 101 to some depth within wellbore 102 along a longitudinal axis 139 of the borehole. In various embodiments, at least some portion of the upper casing 122 may be encased in cement 123. In addition, one or more centralizers 119 may be positioned within the upper casing 122, the centralizers configured to extend between the inner surface of the upper casing 122 and an outer surface of the tubing string 120, and thus stabilize the tubing string with the upper casing.

In various embodiments, a packer 124 is positioned within upper casing 122 at some predetermined depth within wellbore 102, the packer coupled to tubing string 120 and encircled by a sealing element 125 the extends between the packer 124 and the inner surface of the portion of the upper casing 122 where the packer is positioned. A first flow control valve assembly (valve assembly) 140 is positioned downhole from packer 124, and is physically coupled to tubing string 120. Valve assembly 140 includes one or more vapor-transition flow control valves, as described herein, configured to control a flow of carbon dioxide through the valve assembly 140 and into formation 108 in the areas of the formation proximate to the location of valve assembly 140 within the wellbore 102. Packer 124, in conjunction with sealing element 125, provide isolation of an annulus 132, which surrounds the valve assembly 140, from annulus 130, which extends from surface 101 to the uphole side of packer 124 and encircles the tubing string 120 within upper casing 122.

Internal fluid passageways within valve assembly 140 are in fluid communication with downhole fluid tubing 121, wherein the one or more vapor-transition flow control valves are configured to controllably couple the internal fluid passageways of valve assembly 140 to one or more ports 141 of the valve assembly. As such, the one or more vapor-transition flow control valves of valve assembly 140 are configured to allow carbon dioxide that is received at the valve assembly from the downhole tubing string 121 to be controllably released through the one or more ports 141 and into annulus 132. The pressure of the carbon dioxide released into annulus 132 drives the carbon dioxide through perforations 147 extending along wellbore 102 in the vicinity of valve assembly 140, and out into formation 108, as illustratively represented by arrows 133. In various embodiments, only one valve assembly, such as valve assembly 140, is included in wellbore system 100, wherein the carbon dioxide released from port(s) 141 is configured to fill the borehole extending below packer 124, and to exit the borehole through one or more sets of perforations 147 for injection into formation 108.

In the alternative, in wellbore system 100 as illustrated in FIG. 1A three sets of valves assemblies, 140, 142, and 144 are shown, the valve assemblies spaced apart from one another along the wellbore 102, and wherein each of the valve assemblies is surrounded by an respective annulus (132, 134, 136), which are isolated from one another by packers 126 and 128, and wherein the upper-most annulus 132 surrounding valve assembly 140 is isolated from the annulus 130 extending to surface 101 by packer 124. Each of the valve assemblies are in fluid communication with tubing 121, and thus are configured to receive a flow of fluid being provided from the surface 101 through tubing 121. As arranged as illustrated in FIG. 1A, fluid exiting port(s) 141 of valve assembly 140 may be directed to perforations 147 adjacent to annulus 132, and further directed into formation 108 in a zone generally indicated as zone 150. Similarly, fluid exiting port(s) 143 of valve assembly 142 may be directed to perforations 147 adjacent to annulus 134, and further directed into formation 108 in a zone generally indicated as zone 151, while fluid exiting port(s) 143 of valve assembly 144 may be directed to perforations 147 adjacent to annulus 136, and further directed into formation 108 in a zone generally indicated as zone 153. As such, the arrangement of the valve assemblies and the packers isolating the annuluses surrounding the valve assemblies, respectively, may contribute to better control and dispersion of the fluid into formation 108 along the entirety of the wellbore 102 designated for fluid injection.

The arrangement of valve assemblies and packers as shown in FIG. 1A is one non-limiting example of a wellbore system, such as wellbore system 100, and other variations are possible and are contemplated for use in various embodiments of wellbore system 100. For example, the number of valve assemblies included in a particular wellbore system is not limited to a particular number of valve assemblies, and may include one or more valve assemblies. Examples of wellbore system 100 are not limited to having the valve assemblies positioned at a particular depth from surface 101, and may include valve assemblies positioned at varying depths, for example based on the location of a formation material that is determined to be useful for the storage of a fluid, such as carbon dioxide, within the formation material. In various embodiments, the valve assemblies that are included in a wellbore system may or may not be evenly spaced relative to one another along the wellbore, and may include groups of one or more valve assemblies that are spaced apart from another group of valve assemblies by a distance along the wellbore that is different from the spacing between other groups of valve assemblies.

In various embodiments of a wellbore system, a single packer may be used to isolate the annuluses surrounding each of the valve assembles included in the wellbore system from the annulus extending to the surface of the wellbore system. In various embodiments, each of the valve assemblies included in a wellbore system may be isolated from the other valve assemblies included in the wellbore system by a set of packers positioned uphole and downhole from the location of each of the valve assembly. In various embodiments, a group of two or more valve assemblies may be isolated by a pair of packers so that the group of two or more valve assemblies is configured to be in fluid communication with a common annulus. These and other variations of the valve assembly and packer arrangements are possible and are contemplated for use in configurations of wellbore systems that may be utilized for fluid injection operations as described herein, and any equivalents thereof. Further, while wellbore 102 is shown as comprising a vertically oriented borehole, embodiments of wellbores where the valve assemblies may be deployed are not limited to wellbores having any particular orientation, and may include vertical, horizontal, and/or inclined wellbore s, and combination of these, including wellbore systems including one or more branches coupled to a main, a secondary, or other network(s) of a wellbore.

In operation, carbon dioxide stored in vessel 104 is pumped to the wellhead 110 by fluid pump 105 in a phase state that is desirable for injection of the carbon dioxide into formation 108. In various embodiments, that desired state includes carbon dioxide in a high-density fluid phase. In various embodiments, the temperature of the fluid received from the vessel 104 may be altered by one or more temperature control devices 114 in order to allow the pump 107 to pressurize the fluid while allowing the fluid to be transformed into and/or maintained in a desired phase state for injection into formation 108. The high-density fluid carbon dioxide is coupled through valves 111 and into the downhole fluid tubing 121, where it passed through the downhole fluid tubing 121 and is provided to each of the valve assemblies 140, 142, 144.

When the carbon dioxide is provided to the valve assembles in the desired phase state, the one or more vapor-transition flow control valves included in the valve assemblies is/are configured to actuate to an "open" configuration, allowing the carbon dioxide to flow through or past the vapor-transition flow control valve(s), and exit through one or more of port(s) 141, 143, and/or 145, to a respective annulus, and then to flow through perforations 147 in the casing liner of the wellbore and into the formation 108. Arrows 133 represent the flow of carbon dioxide exiting port(s) 141 of valve assembly 140 and flowing into formation 108 in zone 150. Arrows 135 represent the flow of carbon dioxide exiting port(s) 143 of valve assembly 142, and flowing into formation 108 in zone 151. Arrows 137 represent the flow of carbon dioxide exiting port(s) 145 of valve assembly 144 and flowing into formation 108 in zone 153.

In the event the carbon dioxide arriving at the valve assemblies 140, 142, and 144 via the downhole fluid tubing 121 is not in the desired phase state, for example is in a low density phase, the vapor-transition flow control valves of vale assemblies 140, 142, and 144 are configured to actuate to a "closed" configuration, and to block the flow of the carbon dioxide from passing through the valve assemblies and into the formation 108. In addition, if the fluid pressure present in the formation rises to a level that exceeds the pressure present in the carbon dioxide arriving at the valve assembles from the surface, the phase of the carbon dioxide present in the backflow will again cause the vapor-transition flow control valves to actuate to the "closed" position, thereby preventing the carbon dioxide for escaping from the formation 108 back through the valve assemblies, and in conjunction with the packers present in the wellbore, from escaping from the formation 108 back through the wellbore. Thus, the vapor-transition flow control valves of the valve assemblies are configured to allow a flow of carbon dioxide provided to the valve assembles in the desired phase state to be distributed and injected into formation 108, while blocking the flow of carbon dioxide into the formation when the carbon dioxide provided to the valve assemblies from the surface is not in the desired phase state.

In various embodiments, the tubing string 120 is configured to be removable, along with the valve assemblies and/or the packers coupled to the tubing string, upon completion of the fluid injection operations that are to be performed on wellbore 102. In various embodiments, after removal of tubing string 121, the wellhead may be sealed off to provide a fluid seal between the wellbore 102 and areas above the surface.

Figure 1B:
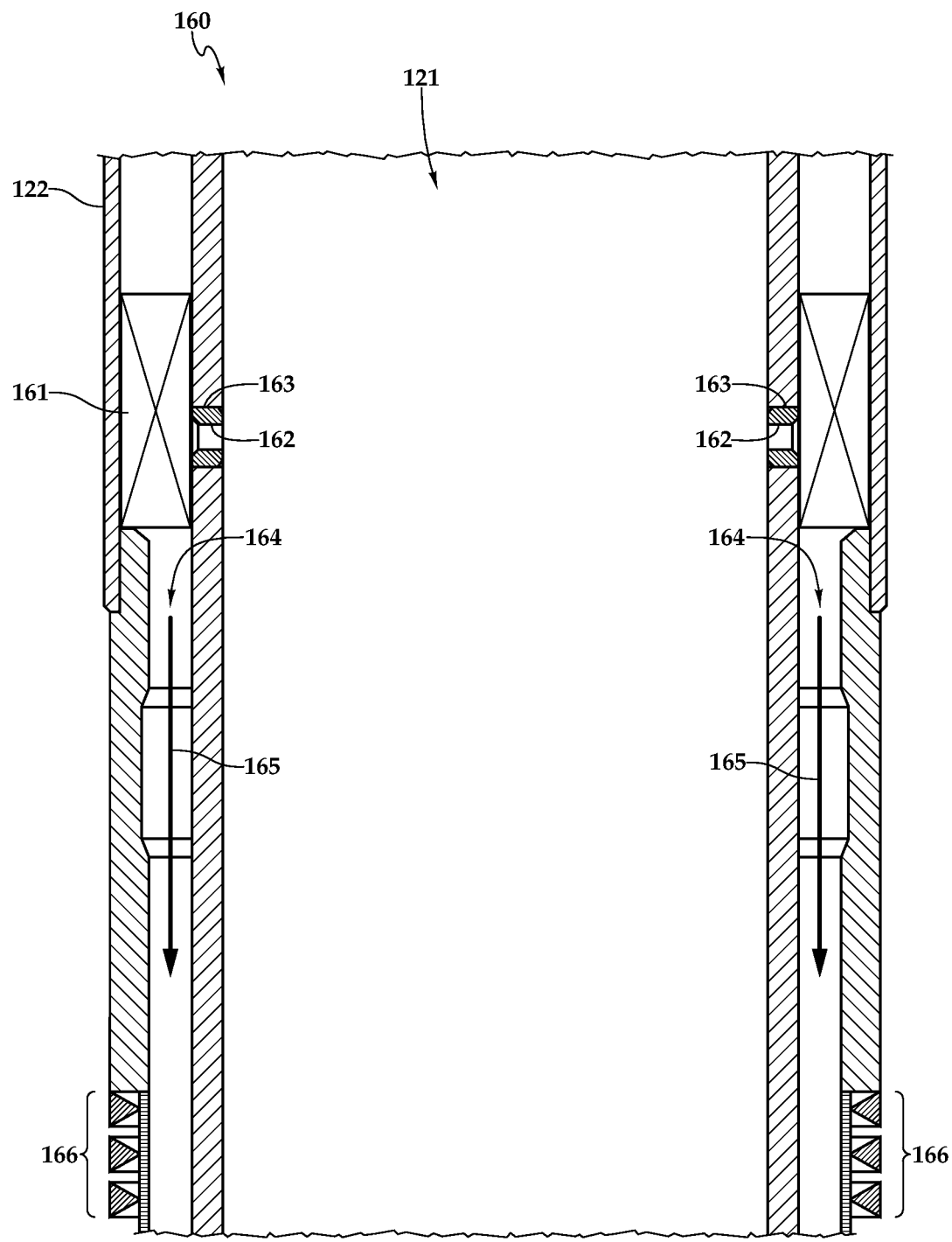
FIG. 1B illustrates a diagram of a portion of a wellbore system configured for fluid injection into a subterranean formation, according to various embodiments.

FIG. 1B illustrates a diagram of a portion of a wellbore system 160 configured for fluid injection of a fluid, such as but not limited to carbon dioxide or hydrogen, into a subterranean formation, according to various embodiments. System 160 includes a downhole fluid tubing 121 arranged to provide a flow of fluid, such as carbon dioxide or hydrogen, from the surface to one or more vapor-transition flow control valves (flow control valves) 161. Embodiments of system 160 may include and/or utilize any of the components described above with respect to system 100 and FIG. 1A in storing, conditioning and delivering to downhole fluid tubing 121 the fluid that is to be injected into a subterranean formation.

As illustrated in FIG. 1B, flow control valves 161 are positioned in a radial arrangement around the outside of downhole fluid tubing 121. In various embodiments, the flow control valves 161 may be held in place by a cover 122. A set of openings 162, which may or may not include a set of seats 163, are arranged to provide a respective fluid passageway between the interior space of downhole fluid tubing 121 and each of flow control valves 161. The flow control valves 161 are configured actuate to an "open" configuration when carbon dioxide having a desired phase state is provided to the flow control valves from the fluid tubing 121. When in the "open" configuration, flow control valves 161 are configured to allow fluid provided by downhole fluid tubing 121 to enter openings 162, and to pass through the respective flow control valve and into one or more fluid passageways 164 leading to a one or more perforations 166, which in various embodiments may include filter or screen 166, the fluid flow illustratively represented by arrows 165. Fluid arriving at perforations 166 may flow through the opening and into an area or areas outside of system 160 and the flow control valves 161. In various embodiments, the area(s) outside of flow control valves 161 may lead to formation material where the carbon dioxide is injected and stored. In various embodiments, the areas outside of flow control valves 161 include an annulus that leads to a subterranean cavity were the carbon dioxide is to be stored.

Although illustrated as having two flow control valves, embodiments of system 160 may include one, two, or more than two flow control valves arranged in a radial arrangement around downhole fluid tubing 121. In addition, more than one set of flow control valves may be arranged at different longitudinal positions along a longitudinal axis 139 of the wellbore where system 160 is deployed so that the different sets of flow control valves are positioned at different depths along the wellbore. Further, although described with respect to receiving and controlling a flow of carbon dioxide, flow control valves 161 may be configured in alternative embodiments to allow a flow of hydrogen through the flow control valves when hydrogen in the desired phase state is provided to the flow control valves from downhole fluid tubing 121, and to block the flow of hydrogen between downhole fluid tubing 121 and the one or more fluid passageways 164 leading to a perforations 166 when the hydrogen provided to the flow control valves in not in the desired phase state.

In various embodiments, flow control valves 161 openings 162, seats 163 (when provided), fluid passageways 164, and perforations 166 are provided as a part of downhole tubing string 121, and are installed in a permanent fashion within a wellbore. In such instances, when the fluid injection operations are completed, opening, and thus tubing string 121, may be sealed off either at the wellhead of the wellbore, or for example using devices such as sleeves or packers (not shown in FIG. 1B), in order to seal off the area(s) outside of casing 122 from the tubing 122 and/or from areas above the surface where the wellbore extends.

Figure 1C:
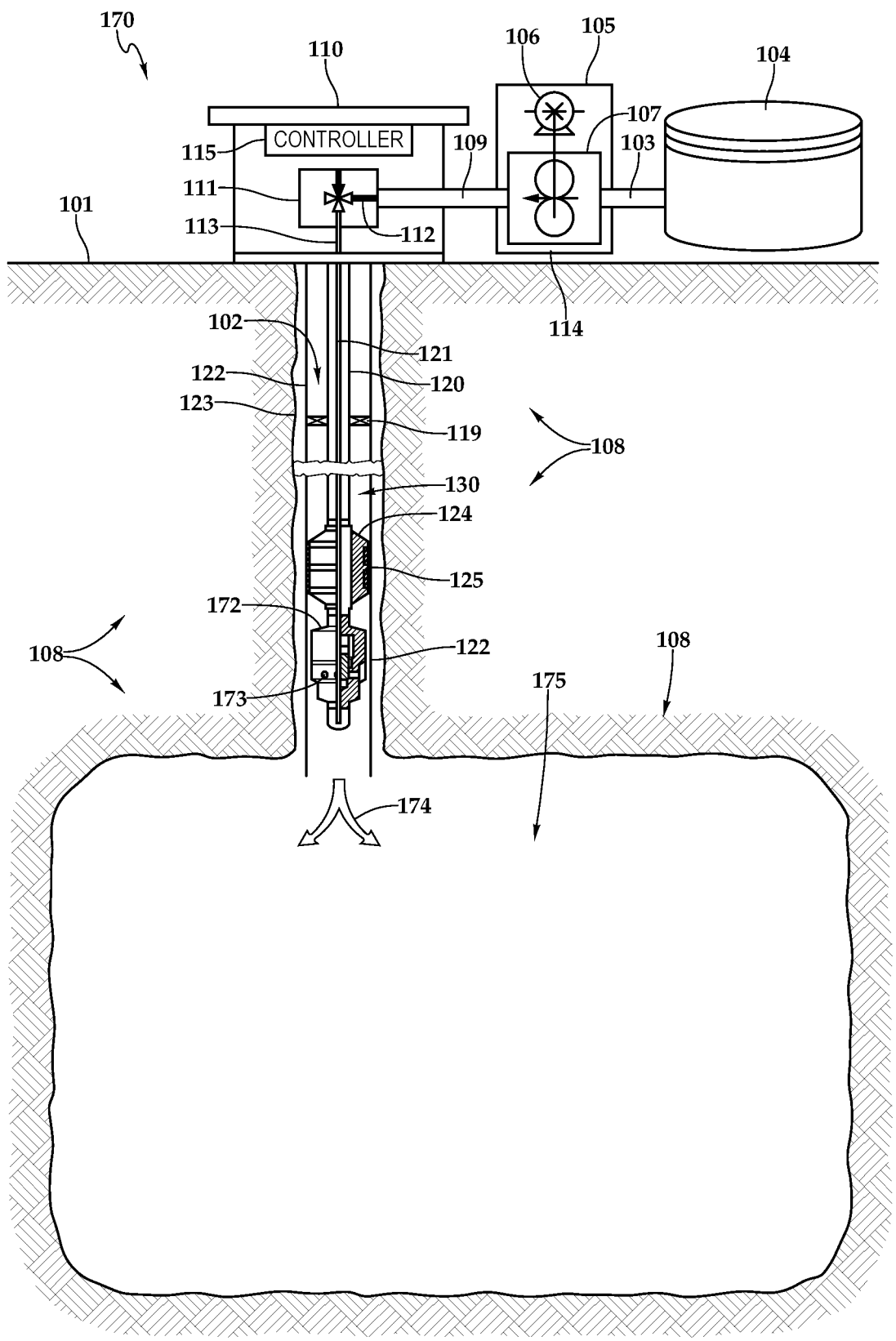
FIG. 1C illustrates a diagram of a wellbore system configured for fluid injection into a subterranean formation comprising a cavity, according to various embodiments.

FIG. 1C illustrates a diagram of a wellbore system 170 configured for fluid injection into a subterranean formation comprising a cavity, according to various embodiments. Although described below with respect to a wellbore system configured to perform fluid injection of hydrogen into a cavity 175, embodiments of the wellbore system (system) 170 are not limited to operations involving hydrogen, and may include fluid injection operations including other types of fluids having various chemical compositions. As shown in FIG. 1C, system 170 includes components above surface 101 and proximate to wellbore 102 that are the same as or similar to components describe above with respect to vessel 104, fluid pump 105, and wellhead 110. In various embodiments, these above-surface components are configured to deliver a flow of fluid comprising hydrogen through tubing 121 to wellbore 102. Tubing 121 is coupled to and is in fluid communication with a flow control valve assembly (valve assembly) 172, which includes one or more vapor-transition flow control valves configured to controllably provide a flow of the hydrogen provided to the valve assembly 172 to port(s) 173. Any hydrogen exiting port(s) 173 of the valve assembly is dispensed into the annulus surrounding valve assembly 172, and may then be dispersed out the end of casing 122 and into cavity 175, as illustratively represented by arrows 174. A packer 124, in conjunction with sealing element 125, provide a fluid seal positioned uphole of the valve assembly 172, and are configured to prevent any hydrogen that exits port(s) 173 from traveling back uphole past the valve assembly 172 and into annulus 130.

Valve assembly 172 may include one or more vapor-transition flow control valves configured with a chamber comprising a fill fluid that allows each of the one or more vapor-transition flow control valves to allow a flow of hydrogen through the respective vapor-transition flow control valve when the hydrogen provided by the tubing 121 to the valve assembly is in the desired phase state, and to block a flow of hydrogen through the respective vapor transition flow control valve when the hydrogen provided by the tubing 121 to the valve assembly is not in the desired phase state. In various embodiments, the desired phase state for the hydrogen provided by the tubing 121 is a liquid or supercritical phase state (high density fluid), which when provided to the valve assembly is configured to cause the one or more vapor-transition flow control valves of valve assembly 172 to actuate to an "open" configuration and provide a fluid passageway of the hydrogen to flow from tubing 121, through or around the one or more vapor-transition flow control valves, and to be expelled from the valve assembly and into cavity 175.

In various embodiments, valve assembly 172 is configured so that a minimum pressure is maintained within cavity 175. In some embodiments, the minimum pressure that is to be maintained in the cavity 175 is in a range of 500 to 1000 pounds/square inch (PSI). In various embodiments, the minimum pressure level to be maintained within cavity 175 is set in order to assure the structural integrity of cavity 175, and for example to assure against a collapse of any portion of the cavity.

Figure 2A:
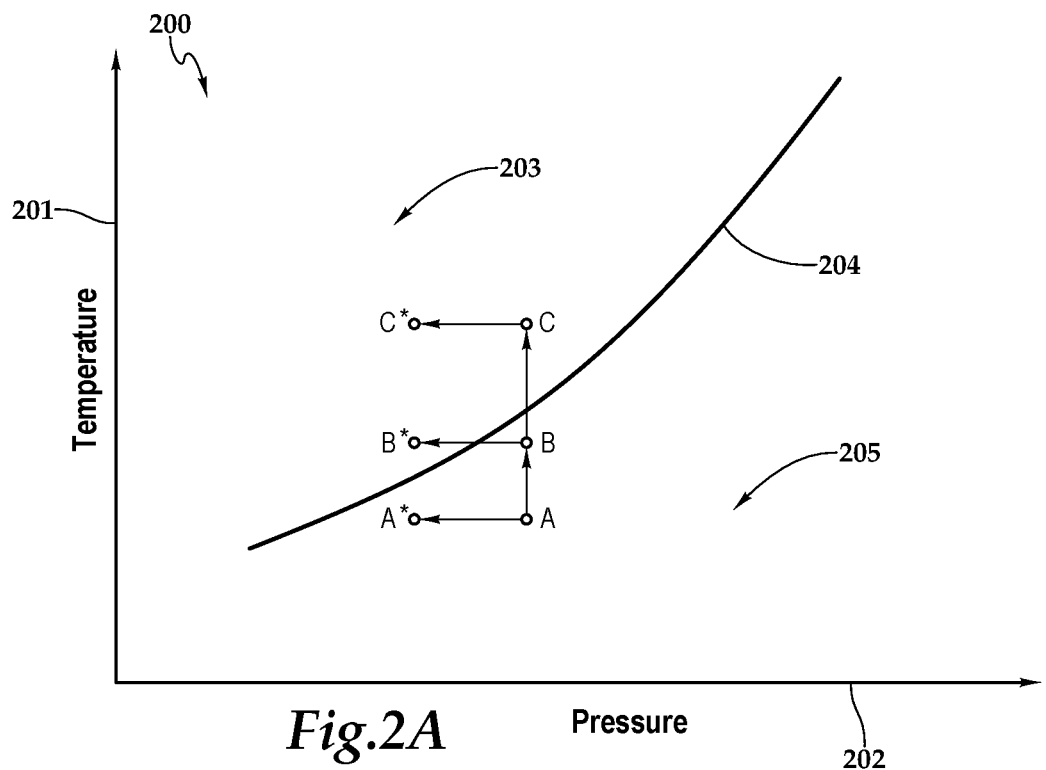
FIG. 2A illustrates a phase diagram for carbon dioxide.

FIG. 2A illustrates a phase diagram 200 for carbon dioxide. Phase diagram 200 includes a vertical axis 201 representing temperatures (temperature increases moving upward in the diagram), and horizontal axis 202 representing pressure (increasing pressure moving in the right-hand direction in the diagram). Graphical line 204 represents the vaporization curve for carbon dioxide ($CO_2$). For temperature/pressure combinations that fall above graphical line 204, as illustratively represented by the area 203 within phase diagram 200, carbon dioxide is in a low-density gaseous phase state. For temperature/pressure combinations that fall below and to the right of graphical line 204, as illustratively represented by area 205 within the phase diagram 200, carbon dioxide is in a high-density fluid phase state.

As shown by phase diagram 200, the vaporization curve represented by graphical line 204 for carbon dioxide requires increasing temperature as the pressure increases for the carbon dioxide to be in the low-density fluid phase state. By way of illustrations, phase diagram 200 includes three illustrative points: Point A, Point B, and Point C. At point A, the temperature/pressure combination is below the vaporization curve represented by graphical line 204, and therefore carbon dioxide at this temperature/pressure combination is a high density fluid. If the pressure of the carbon dioxide is reduced to now include a temperature/pressure combination for the carbon dioxide represented by point A*, point A* is still below the vaporization curve, and therefore carbon dioxide at the temperature/pressure combination represented by point A* is still a high density fluid, and has not changed phase state relative to carbon dioxide at point A due to the lowering of the temperature represented by the change in the temperature/pressure combination from point A to point A*.

At point B, the temperature/pressure combination is below the vaporization curve represented by graphical line 204, and therefore carbon dioxide at this temperature/pressure combination is a high density fluid. If the pressure of the carbon dioxide is reduced to now include a temperature/pressure combination for the carbon dioxide represented by point B*, the temperature/pressure combination at point B* is above the vaporization curve, and therefore the carbon dioxide is a low density fluid. As such, in moving from point B to point B* the carbon dioxide will have transitioned from a high density fluid to a low density phase state.

At point C, the temperature/pressure combination is above the vaporization curve represented by graphical line 204, and therefore carbon dioxide at this temperature/pressure combination is in a low density fluid state. If the pressure of the carbon dioxide is reduced to now include a temperature/pressure combination for the carbon dioxide represented by point C*, point C* is still above the vaporization curve, and therefore carbon dioxide at the temperature/pressure combination represented by point C* is still in a low density fluid state, and has not changed phase state relative to carbon dioxide at point C due to the lowering of the temperature represented by the change in the temperature/pressure combination from point C to point C.

Thus, as illustratively represented by the points A, B, C, and A*, B*, and C* in phase diagram 200, any phase-based control of the fluid using phase control flow valves cannot be based solely on temperature of the fluid, since at a same temperature of the carbon dioxide the carbon dioxide could be in a low density or a high density state. Further, the phase-based control of the fluid using these same phase control valves cannot be based solely on the pressure of the carbon dioxide, since at a same pressure the carbon dioxide could be in a low density or a high density state. In the embodiments as described herein related to control of flows of carbon dioxide for the purposes of fluid injection of the carbon dioxide into subterranean formations, it is desirable to have the carbon dioxide in a high-density fluid phase.

As further described below, the fill fluid included in the closed chamber of the vapor-transition control valves is designed to have a vaporization curve that is the same as or similar to the vaporization curve for carbon dioxide. However, by using an urging member, such as a spring loaded bellows or a metal spring position within the chamber, the pressure in the chamber is held to a lower pressure level than the pressure present outside of the chamber containing the fill fluid. As such, the fill fluid will transition from a high density phase to the low density phase, and thus expand in volume, at a lower pressure then the fluid outside of the chamber. As such, when the carbon dioxide that is to be injected into the formation in a high density phase state, such as at point B in diagram 200, is provided to the flow control valve, the fill fluid in the valve may be at the lower pressure represented by point B*, and thus has transitioned to a low density phase state, thereby expanding and actuating the valve to a "closed" configuration. In the closed configuration the flow of carbon dioxide through or past the valve is blocked. As such, in order for the carbon dioxide that is intended to be injected into the formation to get past the vapor-transition flow control valve(s) it must be provided to the valve assembly in not only the desired phase state, i.e., a high density fluid phase state, but also at a temperature/pressure combination that is far away enough from the vaporization curve so that the lower pressure of the fill fluid contained within the camber of the flow control valve(s) does not transition to the low density phase state, but instead remains in the high density fluid phase state in order to maintain the valve(s) in the "open" configuration.

The injection of the carbon dioxide in the high-density fluid state allows for better control and a more even distribution of the carbon dioxide into the formation material. As such, embodiments of the vapor-transition flow control valves as described herein are configured to allow a flow of carbon dioxide past the flow control valve and to be injected into a subterrain formation when the carbon dioxide presented at the vapor-transition flow control valve is in the high density fluid phase state, and to block the flow of carbon dioxide into the subterranean formation when the carbon dioxide presented at the vapor-transition flow control valve is not in the high density fluid phase state, but instead is for example in the low density fluid phase state.

Figure 2B:
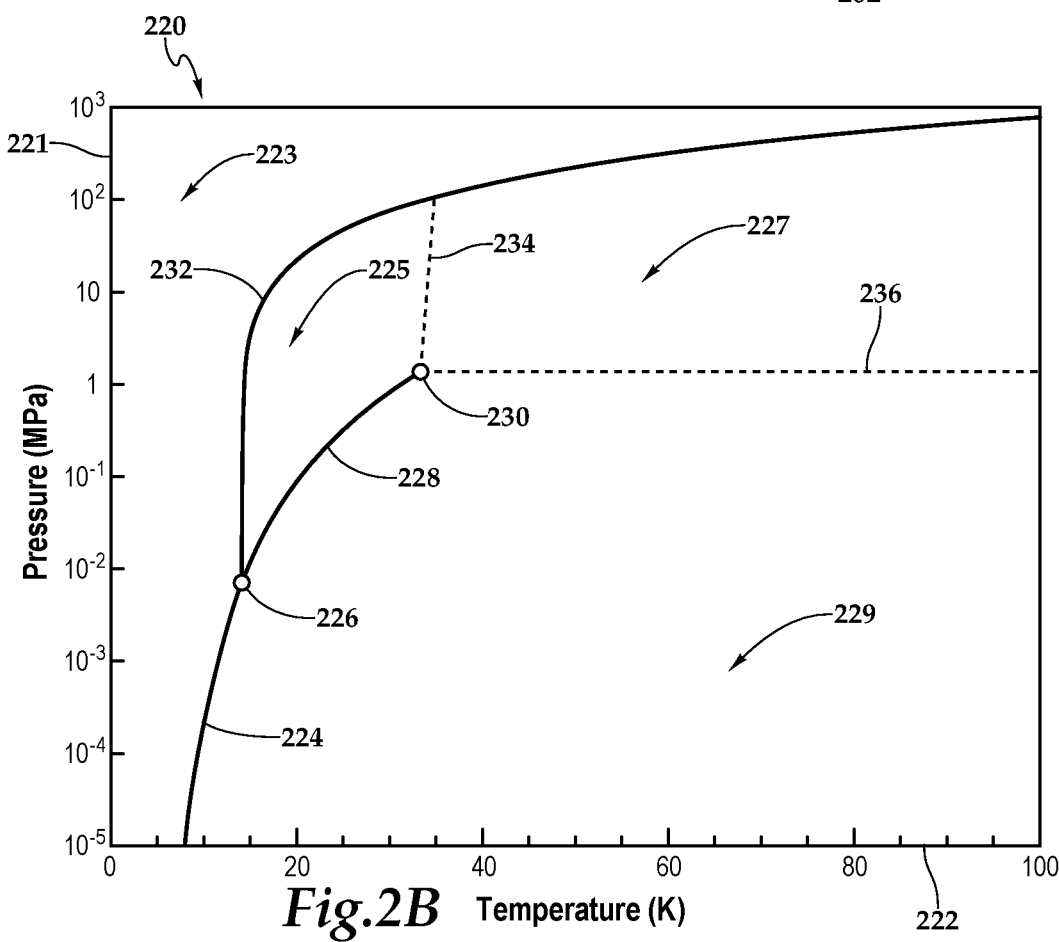
FIG. 2B illustrates a phase diagram for hydrogen.

FIG. 2B illustrates a phase diagram 220 for hydrogen. Phase diagram 220 includes a vertical axis 221 representing pressure in megapascal (Mpa), and horizontal axis 222 representing temperature in degrees Kelvin (K). Graphical line 224 represents a sublimation curve extending from the horizontal axis 222 to triple point 226. Graphical line 228 represents a saturation curve and extends from triple point 226 to critical point 230, and graphical line 232 represents the melting curve that extends upward and away from triple point 226. The area 229, which is bounded by an area to the right of sublimation curve 224 and saturation curve 228 and below dashed line 236, includes temperature/pressure combinations where hydrogen is in a gas phase state. The area 225, which is bounded by and below melting curve 232, above and bounded by saturation curve 228, and bounded by and to the left of dashed line 234, includes temperature/pressure combinations where hydrogen is a liquid. The area 223, which is above and to the left of saturation curve 224 and melting curve 232 includes temperature/pressure combinations where hydrogen is in a solid phase. The area 227 below melting curve 232, bounded on the left by dashed line 234, and above and bounded by dashed line 236 includes temperature/pressure combinations where hydrogen is in a supercritical state. In various embodiments, the hydrogen that is to be delivered to the vapor-transition flow control valves for storge in an subterranean formation or cavity is to be in a supercritical phase state or liquid (high density fluid state), and the flow control valves configured to actuate to an "open" configuration and allow a flow of the hydrogen through the valves only when the hydrogen presented to the valves is in the high density fluid state.

As such, embodiments of the vapor-transition flow control valves as described herein are configured to allow a flow of hydrogen through or past the flow control valve or valves, and to be injected into a subterrain formation or cavity when the hydrogen presented at the flow control valve(s) is in the high density fluid phase state, and to block the flow of hydrogen into the subterranean formation or cavity when the hydrogen presented at the flow control valve(s) is not in the high density fluid phase state, for example in the gas or vapor phase states.

FIGS. 3A-3D, 4, and 5 illustrate vapor-transition flow control valves according to various embodiments that may be used in a wellbore system for carbon dioxide and/or hydrogen injection and/or storage into subterranean formations.

Figure 3A:
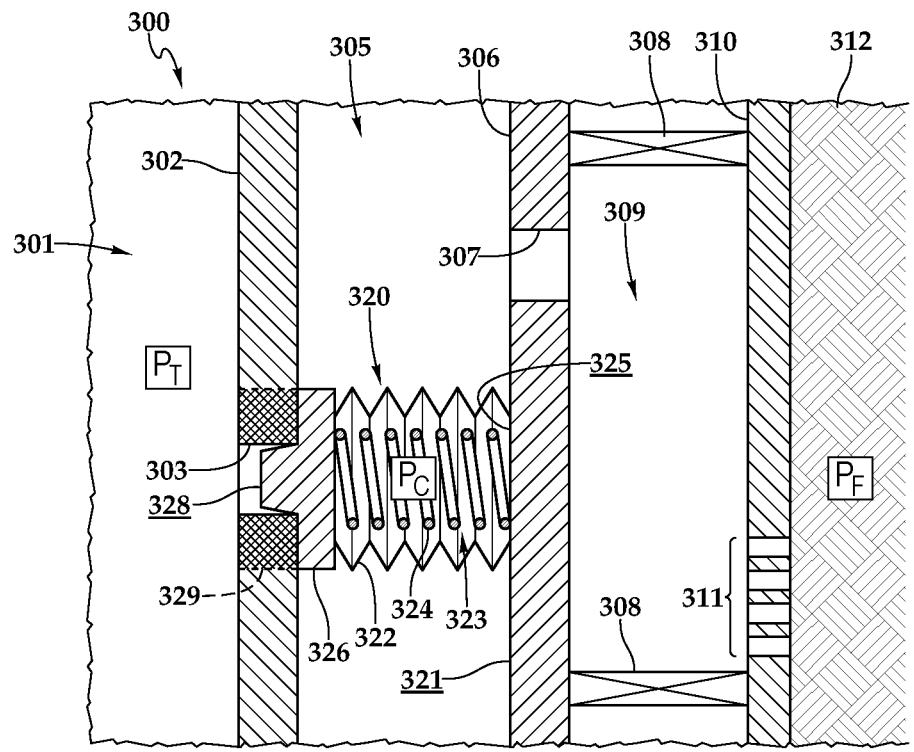
FIG. 3A illustrates a cross-sectional view of a flow control valve positioned in a wellbore system configured for use in fluid injection operations, according to various embodiments.

FIG. 3A illustrates a cross-sectional view of a flow control valve 320 positioned in a wellbore system 300 configured for use in fluid injection operations, according to various embodiments. Wellbore system 300 includes a tubing 302 that encircles and at least partially encloses an interior space 301. In various embodiments, tubing 302 and interior space 301 may extend to a surface of a borehole of a wellbore in which flow control valve 320 is located, wherein tubing 302 is configured to provide a fluid passageway, e.g., interior space 301, configured to deliver a fluid, such as carbon dioxide or hydrogen, from the surface to the location within the wellbore system where flow control valve 320 is located. In various embodiments, tubing 302 may be an embodiment of fluid tubing 121, as illustrated and described above with respect to any of FIGS. 1A, 1B, and 1C.

Referring again to FIG. 3A, flow control valve 320 is positioned in an annulus area 305 that encircles tubing 302. In various embodiments, valve 320 comprises a bellows 322 that is affixed at a bottom surface 325 of the valve to an inner surface 321 of a tubing string 306 that encircles tubing 302. Bellows 322 extends to an end cap 326 that is affixed to an end of the bellows 322 opposite the bottom surface 325. Bellows 322 encloses a fluid filled chamber 323 comprising a space within the bellows that is filled with a fill fluid having certain phase characteristic(s) that provides for operation of valve 320 in a desired manner for use in controlling fluid injection operations, as further described below.

In addition to providing a mounting surface for valve 320, tubing string 306 includes an opening 307 that provides a fluid passageway between annulus area 305 and an annulus area 309. In various embodiments, annulus area 309 encircles the tubing string 306. Annulus area 309 is formed between the outer surface of the tubing string 306 and an inner surface of a borehole liner or casing 310, which encircles annulus area 309. Portions of an outer surface of the casing 310 may be in direct contact or proximate to formation material 312. Further, casing 310 includes one or more perforations 311, which may be formed as a screen, and which provide one or more fluid passageways between annulus area 309 and the formation material 312. In various embodiments, one or more packers 308 may be positioned within annulus area 309, and for example at positions uphole and downhole of the location of opening 307, in order to isolate a portion of the annulus area 309 from additional annulus(es) formed between tubing string 306 and casing 310.

As shown in FIG. 3A, bellows 322 includes an urging device 324, which may comprise a metal spring, positioned within chamber 323, and configured to reduce the pressure of the filing fluid inside chamber 323 by exerting a force on bellows 322 urging the bellows to expand and extend from the inner surface 321 of the tubing string 306 to drive end cap 326 into contact with tubing 302 in the area of opening 303. In various embodiments, end cap 326 includes an extended portion 328 of the end cap configured to extend, at least partially, into opening 303, and thereby form a fluid seal with opening 303, thereby preventing a flow of fluid between interior space 301 and annulus area 305. In various embodiments, opening 303 may include a seat 329 positioned within the opening, wherein seat 329 may be made of a material that is different from the material used to form tubing 302. In various embodiments, seat 329 may be formed from a material, such as tungsten carbide, which is resistant to erosion of the size and shape of opening 303 due to high velocity flows of fluid through the opening. In various embodiments, seat 329 may be formed from a material, such as ceramic, which is resistant to hydrogen embrittlement.

As shown in FIG. 3A, valve 320 is in a "closed" configuration, wherein the bellows 322 is in an expanded state such that the end cap 326, (and the extension portion 328 when provided), are moved to be in contact with the opening 303 (and seat 329 when provided), thereby sealing off opening 303. When opening 303 is sealed, any fluid flows from interior space 301 through opening 303 and into annulus area 305 are blocked. In such instances, the pressure $P_T$ present in interior space 301 is not sufficient to overcome the pressure $P_C$ currently present within the chamber 323 of valve 320, and therefore end cap 326 remains in contact with and forming a fluid seal that blocks fluid flow through opening 303.

In various embodiments, the fill fluid present within chamber 323 is carbon dioxide, or an azeotrope of carbon dioxide. An azeotrope is generally defined as a mixture of two or more liquids in such a way that its components cannot be altered by simple distillation. This happens because, when an azeotrope is boiled, the vapor has the same proportions of constituents as the unboiled mixture. When the fill fluid contained with the chamber of the valve is in a gas phase state, the expansion of the fill fluid causes the bellows 322 to expand, and thereby moves the end cap 326 (and the extension portion 328 when provided) to contact opening 303 and block the flow of fluids through opening 303. Valve 320 may be configured using a fill fluid in chamber 323 comprising carbon dioxide or an azeotrope of carbon dioxide when valve 320 in order to be utilized downhole in a wellbore system configured to inject carbon dioxide into a formation material, such as but not limited to wellbore system 100 as illustrated and described with respect to FIG. 1C.

In various embodiments, the fill fluid contained in chamber 323 can be operating at a slightly reduced pressure, $P_C$, because of the springs 324 stretching the bellows 322, or the bellows themselves acting as a spring. Thus, as an example the pressure in the chamber 323 of the bellows, $P_C$, is ~25 pounds per square inch (psi) lower than the pressure in the tubing, $P_T$. The phase change for the fluid in the bellows can occur at a lower pressure than the pressure of the carbon dioxide in the production.

The spring 324 can reduce the pressure in the chamber 323 of the bellows. Assume that $P_C$ is pressure in the chamber 323; $P_T$ is pressure in the tubing; and $F_{spring}$ is the force of the spring. Then $P_C$ can be defined as follows by Equation (1):

$$P_B = P_T - F_{spring}/\text{Area} \qquad (1)$$

Referring back to FIG. 2A, at low temperatures, a condition A is such that all of the fill fluid in the chamber 323 is a liquid, and the valve is in an "open" configuration. At high temperatures, a condition C is such that all of the fill fluid is a gas, and the valve is in a "closed" configuration. As the injection pressure starts being reduced, the pressure will fall. At a condition B, fluid in the formation and in the tubing is liquid. The fill fluid in the bellows of the valve is at a lower pressure ($P_C$) is at gas phase state. Thus, the fill fluid in the bellows becomes a gas and expands to close the valve. The area ratio between the bellows and the seal helps to create a higher force sealing the flow passageway. This helps to leverage the high displacement, low force behavior of a phase valve.

As an example, assume that the hydrostatic pressure is 1000 psi and that the pressure in the bellows is 975 psi. The vaporization temperature of $CO_2$ at 500 psi is 82 F and at 975 psi is 80 F. When the system reaches 80 F, the gas in the bellows vaporizes and expands. The gaseous fill fluid will want to expand 2.5 times larger than the liquified carbon dioxide. However, the valve will operate with essentially zero force at 80 F. Thus, the valve will only close if there is zero flow.

When the system reaches 82 F, the fill fluid in the bellows will turn gaseous with an additionally 25 psi of pressure, the amount of the spring in the bellows. As a result, there will be 25 psi operating on the bellows trying to close the valve. For a one inch diameter baffle, this is 20 pounds pushing on the valve. If the valve opening is ¼ inch, then this corresponds to 400 psi closing pressure. The valve will hold 400 psi as the gas tries to exit the tubing, or to pull with 400 psi as the valve seeks to open and to allow gas to exit once the pressure increases. As such, the opening and closing of the valve when operating near the vaporization curve for carbon dioxide incorporates some hysteresis, which reduces or eliminates valve chatter.

Referring back to FIG. 3A, in various embodiments wherein the fill fluid present within chamber 323 is hydrogen, or an azeotrope of hydrogen, and is in a gas phase state, the expanded gas phase state of the hydrogen causes the bellows 322 to expand and thereby moves the end cap 326 (and the extension portion 328 when provided) to contact opening 303 and block the flow of fluids through opening 303. Valve 320 may be configured using a fill fluid in chamber 323 comprising hydrogen or an azeotrope of hydrogen when valve 320 is configured to be utilized downhole in a wellbore system configured store hydrogen in a subterranean formation or cavity, such as but not limited to wellbore system 170 as illustrated in described with respect to FIG. 1C.

Figure 3B:
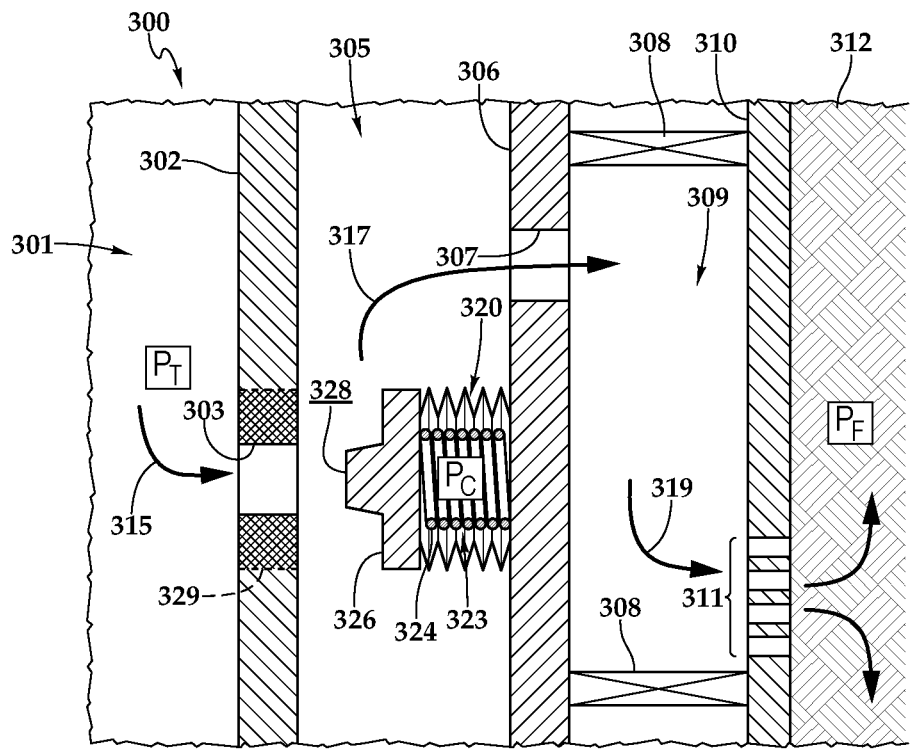
FIG. 3B illustrated a cross-sectional view of the flow control valve of FIG. 3A in an open configuration, according to various embodiments.

FIG. 3B illustrated a cross-sectional view of the vapor-transition flow control valve of FIG. 3A, according to various embodiments. As shown in FIG. 3B, flow control valve 320 is shown in an "open" configuration, wherein bellows 322 has retracted to a position where end cap 326 has been moved away from tubing 302, and extended portion 328 has been withdrawn from opening 303. As such, opening 303 provides a fluid passageway for a flow of fluid, represented by arrow 315, to occur between interior space 301 and annulus area 305. The flow of fluid provided from interior space 301 may include a fluid that is intended to be injected into formation material 312, or some other subterranean cavity, and which has been provided to interior space 301 in a desired phase state that in turn operated valve 320 to open and allow the fluid flow to occur from interior space 301 to annulus area 305. Once the flow of fluid from interior space 301 have moved to annulus area 305, it then continues through opening 307 and into annulus area 309, as illustratively represented by arrow 317, and from annulus area 309 through perforations 311 into formation 312, as illustratively represented by arrow 319. In various embodiments, the flow of fluid is formed of carbon dioxide and is injected into formation material 312. In various embodiments, the flow of fluid is formed of hydrogen, and is injected into an open cavity, which may be in fluid communication with annulus area 309, or an end portion of the casing forming annulus area 309 and extending into the open cavity where the hydrogen is being stored.

In various embodiments, valve 320 has moved from the "closed" configuration as shown in FIG. 3A to the "open" configuration as shown in FIG. 3B due to fluid present in interior space 301, for example as provided from the surface through tubing 302, being in a desired phase state for injection into the subterranean formation or cavity. For systems configured for carbon dioxide injection, carbon dioxide provided to interior space 301 in a high density fluid phase may act upon valve 320, causing the valve to move and/or to remain in the "open" configuration, thus allowing injection of the carbon dioxide into formation material 312, as described above. For systems configured for hydrogen storage, the hydrogen provided to interior space 301 in a high density fluid state acts upon valve 320, causing the valve to move to and/or to remain in the "open" configuration, thus allowing a flow of hydrogen to occur from the interior space 301 to an area of storage located outside of casing 310.

Figure 3C:
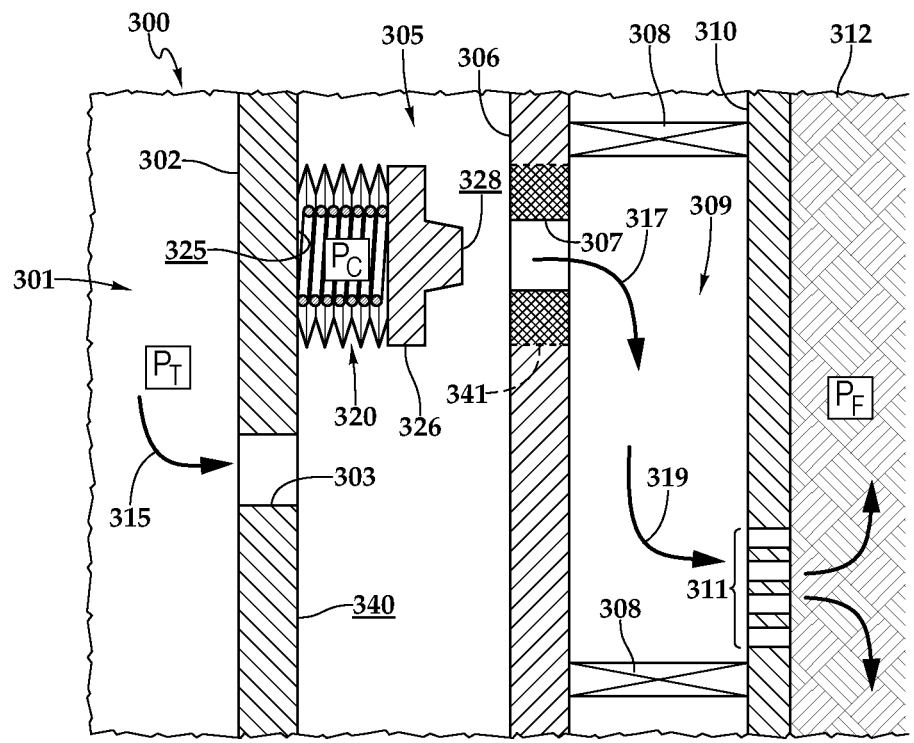
FIG. 3C illustrates a cross-sectional view of the flow control valve of FIG. 3A arranged in an alternative positioning within a wellbore system, according to various embodiments.

FIG. 3C illustrates a cross-sectional view of the vapor-transition flow control valve 320 of FIG. 3A, arranged in an alternative positioning within a wellbore system 300, according to various embodiments. Valve 320 as shown in FIG. 3C may be configured to provide any of the features, and to perform any of the functions as described above with respect to valve 320 in FIGS. 3A and 3B, with the variations as further described for FIG. 3C. As shown in FIG. 3C, flow control valve 320 is positioned in annulus area 305, but having the bottom surface 325 of the bellows 322 affixed to an outer surface 340 of the tubing 302, and the end cap 326 opposite the bottom surface 325 positioned so that the end cap, and in various embodiments the extension portion 328 when provided, may be extended to form a fluid seal with opening 307 of the tubing string 306. As arranged in FIG. 3C, a flow of fluid provided to interior space 301 of tubing 302 is in fluid communication with annulus area 305 through opening 303, regardless of the "open" or "closed" configuration of valve 320. Fluid provided to interior space 301 may pass through opening 303 and be in contact with and/or surround bellows 322 of valve 320. Depending on the temperature/pressure, and thus the phase state of the fluid present in annulus area 305, the fill fluid within bellows 322 of valve 320 will either expand and thus actuate the valve 320 to the "closed" configuration and block off opening 307 using end cap 326 and extension portion 328 when provided, or contract and actuate valve 320 to the "open" configuration and allow a flow of fluid between annulus area 305 and annulus area 309 through opening 307, as illustratively represented by arrow 317.

As located and positioned as shown in FIG. 3C, the bellows 322 of valve 320 is still configured to expand and contract in a direction radially along an axis that is perpendicular to a longitudinal axis extending through interior space 301 and along the direction of the wellbore where valve 320 is positioned, but in contrast to valve 320 as shown in FIG. 3A, valve 320 in FIG. 3C is arranged to open or seal off the opening 307 extending through the tubing string 306. When in the open configuration, fluid provided from interior space 301 to annulus area 305 may pass through opening 307 and into annulus area 309, as illustratively represented by arrow 317. From annulus area 309, the flow of fluid may exit annulus area 309 through perforations 311 in casing 310, and flow into formation material 312, as illustratively represented by arrow 319. When in the "closed" configuration, end cap 326 (and including extension portion 328 when provided) of valve 320 is brought into contact with opening 307 to form a fluid seal with opening 307, and/or with a seat 341 which may be provided to from opening 307. When opening 307 is sealed by the valve 320 being in the "closed" configuration, the fluid pathway between annulus area 305 and annulus area 309 is closed off, thus preventing fluid provided to interior space 301 from being provided to annulus area 309, and thus is prevented being allowed to flow into the formation material 312.

In various embodiments, the fill fluid provided in chamber 323 of valve 320 may be carbon dioxide, or an azeotrope of carbon dioxide, wherein valve 320 is configured to be actuated to the "open" configuration and allow the flow of carbon dioxide from interior space 301 to the formation 312 only when the carbon dioxide is provided to interior space 301 in the desired phase state as described above with respect to FIG. 1A. In various embodiments, the fill fluid provided in chamber 323 of valve 320 as arranged in FIG. 3C is hydrogen, or a azeotrope of hydrogen, wherein valve 320 is configured to be actuated to the "open" configuration and allow the flow of hydrogen from interior space 301 to a subterranean formation outside of casing 310 and configured for storage of hydrogen only when the hydrogen is provided to interior space 301 in the desired phase state as, described above with respect to FIG. 1A.

Figure 3D:
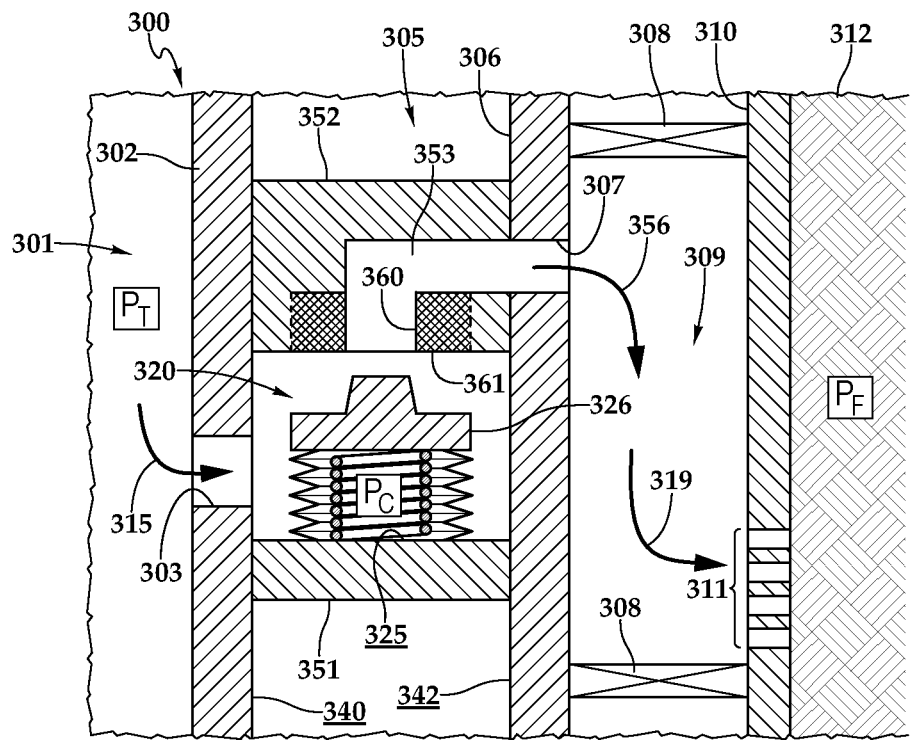
FIG. 3D illustrates a cross-sectional view of the flow control valve of FIG. 3A arranged in yet another alternative positioning with a wellbore system, according to various embodiments.

FIG. 3D illustrates a cross-sectional view of the vapor-transition flow control valve 320 of FIG. 3A arranged in an alternative positioning within a wellbore system 300, according to various embodiments. Valve 320 as shown in FIG. 3D may be configured to provide any of the features, and to perform any of the functions as described above with respect to valve 320 in FIGS. 3A and 3B, with the variations as further described for FIG. 3D. As shown in FIG. 3D, flow control valve 320 is positioned in annulus area 305, but having the bottom surface 325 of the bellows 322 affixed to a lower strut 351. Lower strut 351 extends between an outer 340 of tubing 302 and an inner surface 342 of tubing string 306, and is positioned downhole of opening 303 in tubing 302. An upper strut 352 also extends between the outer 340 of tubing 302 and the inner surface 342 of tubing string 306, and is positioned uphole of both valve 320 and opening 303. Upper strut 352 includes an opening 360 positioned uphole of the end cap 326 (and extension portion 328 when provided), at a distance from the lower strut 351 such that when valve 320 is actuated in the "closed" configuration, the end cap (and the extension portion when provided) engage opening 360, and form a fluid seal with the opening 360. In various embodiments, opening 360 may include a seat 361 encircling opening 360, which is configured to engage with opening 360 (and extension portion 328 when provided) and to form the fluid seal blocking fluid flows through opening 360.

As shown in FIG. 3D, upper strut 352 includes a fluid passageway 353 the extends from opening 360 to opening 307 in tubing string 306. When valve 320 is in the "open" configuration as illustrated in FIG. 3D, a flow of fluid from interior space 301 may pass through opening 303 and into annulus area 305, as illustratively represented by arrow 315, and from annular area 305 through opening 360, through fluid passageway 353, and into annulus area 309 through opening 307, as illustratively represented by arrow 356. Once in annulus area 309, the flow of fluid may continue to perforations 311, as illustratively represented by arrow 319, and be dispersed out into formation 312, or into some other subterranean formation, such as a subterranean cavity.

As arranged in FIG. 3D, the bellows 322 of valve 320 is configured to expand and contract in a longitudinal direction that is parallel to a longitudinal axis extending along the wellbore where valve 320 is configured as shown. In alternative embodiments, valve 320 could positioned (e.g., rotated 180 degrees from the position shown in FIG. 3D), so that the lower strut 325 is positioned uphole of valve 320, and the upper strut 352 is positioned downhole of the valve, so that valve 320 expends in a downhole direction but still seals opening 360 to block the flow of fluid through annulus area 305, and withdrawals in an uphole direction to open the opening 360 and allow a flow of fluid from interior area 301 through annulus area 305 to annulus area 309 based on the phase state of the fluid provided to interior area 301.

Figure 4:
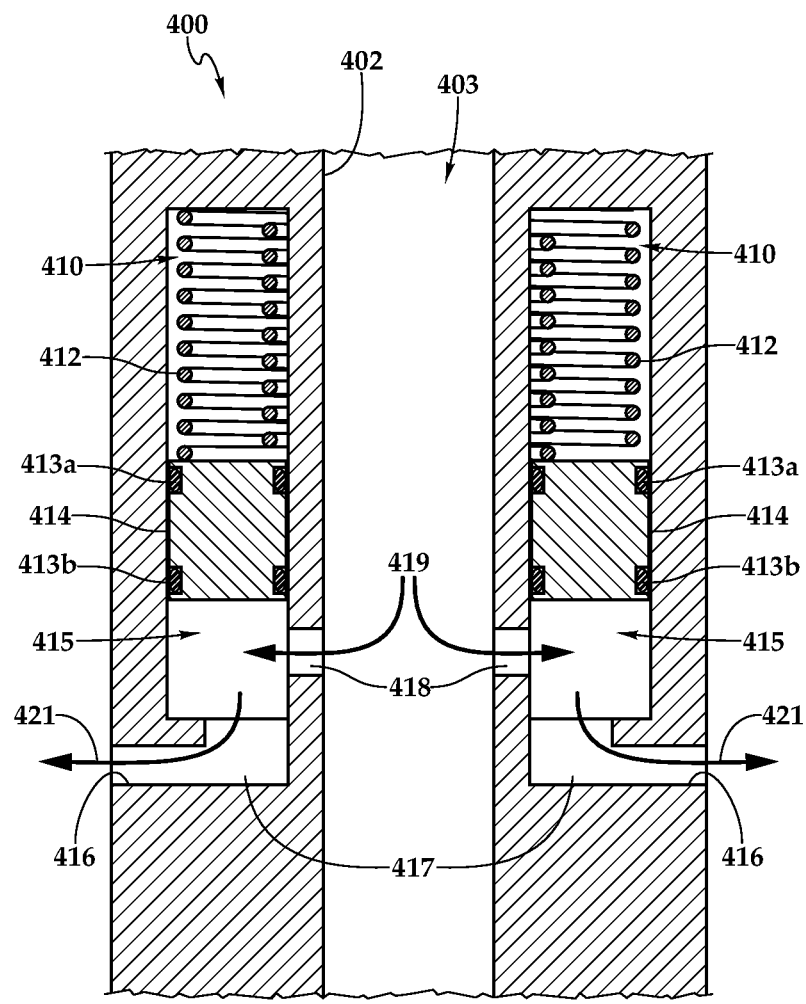
FIG. 4 illustrates a cross-sectional view of a flow control valve configured for use in wellbore fluid injection operations, according to various embodiments.

FIG. 4 illustrates a cross-sectional view of a flow control valve 400 configured for use in wellbore fluid injection operations, according to various embodiments. As shown in FIG. 4, flow control valve (valve) 400 comprises a housing 402 that includes internal chamber 410 and a movable piston 414 forming one end of the internal chamber 410. Movable piston 414 in various embodiments comprises an annular shape that encircles an interior space 403, wherein interior space 403 may extends or at least be in fluid communication with a source of fluid, such as carbon dioxide or hydrogen, which is to be injected into a subterranean formation, such as a formation material or a subterranean cavity. As shown in FIG. 4, movable piston 414 is positioned in a retracted configuration such that the movable piston is positioned away from and not blocking opening 418. When movable piston 414 is in the "retracted" configuration, interior space 403 is in fluid communication with inner space 415 formed within housing 402, and a fluid provided to interior space 403 may pass through opening 418 and into inner space 415. Once in inner space 415, the fluid provided from interior space 403 may continue to flow out of inner space 415, through opening 416, and to areas outside of housing 402 as illustratively represented by arrows 421. In various embodiments, the areas outside of housing 402 may be in fluid communication with an annulus, such as annuluses 132, 134, 136 (FIG. 1A) that allow the fluid to move into a formation material, or an open ended casing, such as casing 122 (FIG. 1C) that allows access of the flow of fluid to a subterranean cavity, such as cavity 175 (FIG. 1C).

Flow control valve 400 may assume the "retracted" configuration during times when the fluid provided to interior space 403 is in the desired phase state for passing the fluid on to the subterranean formation through valve 400. At times when the fluid provided to interior space 403 is not in the desired phase state for passing along to the subterranean formation, valve 400 may assume an "extended" configuration. When in the "extended" configuration, a fill fluid present in internal chamber 410 expands due to the phase state of the fluid being provided in interior space 403, thus causing the movable piston 414 to move to a position occupying the inner space 415. When extended into inner space 415, a side portion of the moving piston is positioned adjacent to and blocks off opening 418. In addition, a set of seals 413A are positioned above opening 418, and a second set of seals 413B are positioned below opening 418, thereby forming a fluid seal between the side of the moving piston and the opening 418. As such, when in the "extended" configuration, moving piston 414 seals off the fluid passageway(s) extending between interior space 403 and areas outside valve 400 that pass through the housing 402.

As shown in FIG. 4, embodiments of valve 400 include an urging device 412, which may be a metal spring, positioned within internal chamber 410, and configured to provide an urging force on the moving piston 414. The urging force provided on movable piston 414 results in a reduced pressure of the fill fluid present in the internal chamber. In various embodiments, the fill fluid is carbon dioxide, or an azeotrope of carbon dioxide, wherein valve 400 is configured for use as part of a wellbore system to be used to inject carbon dioxide into a formation. In such embodiments, when carbon dioxide is provided to interior space 403 in the liquid or high density fluid phase state, the fill fluid in the internal chamber 410 assumes a liquid phase state, and the movable piston 414 is actuated to the "retracted" position, wherein the carbon dioxide provided to interior space 403 flows through opening 418, through inner space 415, and exits opening(s) 416. When carbon dioxide is not provided to interior space 403 in the liquid or high density fluid phase state, but for example is provided in the gaseous or low density phase state, the fill fluid in the internal chamber 410 assumes a gaseous or low density phase state, and the movable piston 414 is actuated to the "extended" position, and blocks opening (s) 418, thereby blocking the flow of carbon dioxide from interior space 403 through valve 400.

In various embodiments, the filing fluid present in the internal chamber 410 is hydrogen, or an azeotrope of hydrogen, wherein valve 400 is configured for use as part of a wellbore system to be used to inject hydrogen into a subterranean formation or cavity. In such embodiments, when hydrogen is provided to interior space 403 in the high density fluid phase state, the fill fluid in the internal chamber 410 assumes a high density fluid phase state, and the movable piston 414 is actuated to the "retracted" position, wherein the hydrogen provided to interior space 403 flows through opening(s) 418, through inner space 415, and exits opening(s) 416. When hydrogen is not provided to interior space 403 in the high density fluid phase state, but for example is provided in a low density fluid phase state, the fill fluid in the internal chamber 410 assumes a low density fluid phase state, and the movable piston 414 is actuated to the "extended" position and blocks opening(s) 418, thereby blocking the flow of hydrogen from interior space 403 through valve 400.

Figure 5:
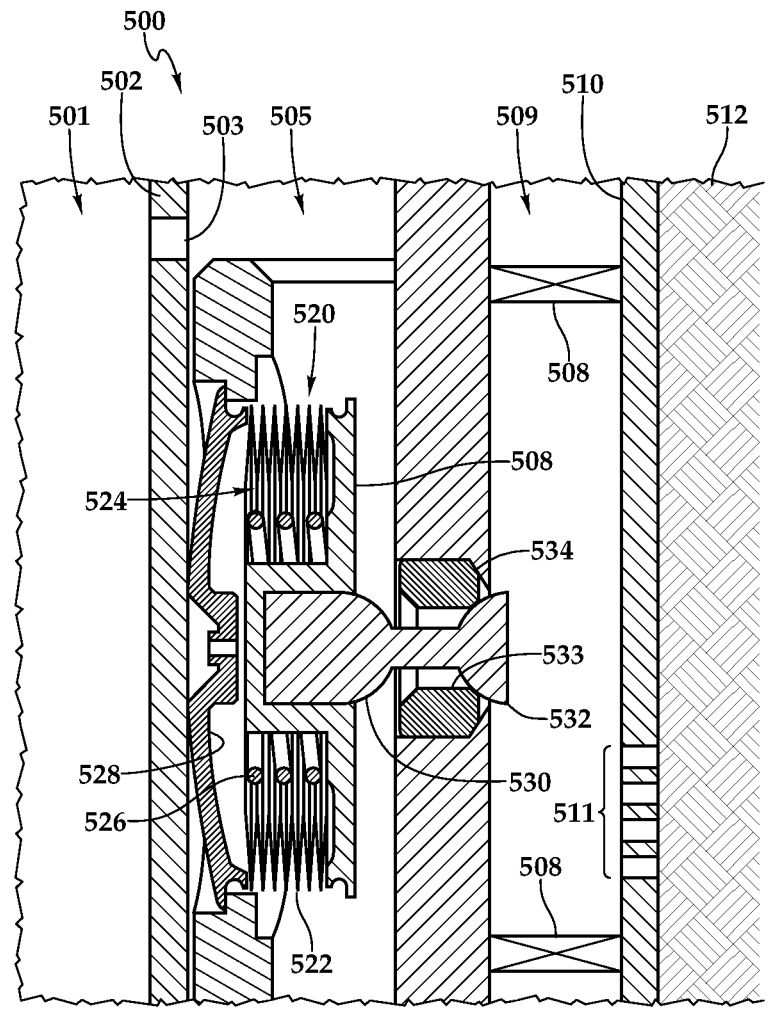
FIG. 5 illustrates a cross-sectional view of a flow control valve configured for use in wellbore fluid injection operations, according to various embodiments.

FIG. 5 illustrates a cross-sectional view of a flow control valve 520 configured for use in wellbore fluid injection operations, according to various embodiments. As shown in FIG. 5, flow control valve 520 is positioned in a portion of a wellbore system 500, and includes the flow restricting member 530 that can engage the seat 534 and increasingly restrict flow through the opening 533 (or entirely prevent such flow) when the fill fluid 524 in the chamber 528 is in liquid or high density phase state, and when the fluid to be injected is in a gaseous or low density fluid phase state. For example, the flow control valve 520 is configured "open" (or choke flow less) when the fill fluid 524 in the chamber 528 vaporizes, expanding the bellows and displacing the flow restricting member 530 out of sealing engagement with the seat 534. This function could be useful, for example, if the flow control device 500 is used to control injection of the fluid provided at interior space 501 of tubing 502 (so that the fluid is not injected, unless it has reached a desired temperature, pressure, and/or phase).

Prior to the flow control device 500 "opening," it can serve as a pressure relief valve, since a predetermined increased pressure in the annular space 505 can serve to push the flow restricting member 530 off of the seat 534 to allow flow of the fluid from the interior space 501 through the opening 503. Fluid flowing through opening 503 enters annulus areas 505, and when valve 520 is in the "open" position, flows though opening 533 into annulus area 509. Annulus area 509 in various embodiments is isolated using packers 508. Fluid arriving in annulus area 509 may exit annulus 509 through screen 511, and be injected into formation 512.

As the temperature decreases and/or the pressure increases, the flow control device 500 could then "open" again (e.g., to permit relatively unrestricted flow of saturated steam). Further temperature decrease and/or pressure increase causing the fill fluid 524 in the chamber 528 to condense, resulting in the flow control device 500 "closing" again (e.g., to prevent or restrict injection fluid into annulus area 509, and thus into formation 512 through screen 511).

Note that, in any of the examples of the flow control device 500, a fluid pressure in the chamber 528 can be above or below the vaporization curve for carbon dioxide as shown in FIG. 2A, and/or the liquid or supercritical area as shown for hydrogen in FIG. 2B. For example, the biasing device 526 as shown in FIG. 5 may increase or decrease the pressure within chamber 528 as desired. The biasing force exerted by the biasing device 526 may be varied as a function of displacement of the wall 508 to facilitate desired operation of the valve 500. In some examples, the biasing force can transition between positive and negative. This provides for further fine tuning of the valve's response to changes in pressure, temperature and pressure differential at the flow control device. In various examples, biasing device 526 may bias a wall 508 of the chamber 528 outward. The biasing device 526 may apply a biasing force which increases the volume of chamber 528. In various embodiments, biasing device 526 may comprise a spring positioned within the chamber 528. In various embodiments, the biasing device 526 may comprise a wall of the chamber 528, such as a wall of the bellows 522. In various embodiments, chamber 524 may be disposed within bellows 522.

In various embodiments, valve 520 may vary a restriction of the flow of fluid through the opening 533, in response to changes in the volume of chamber 524. In various examples, only a single fluid may be disposed in the chamber 524, which in some embodiments is carbon dioxide and in other embodiments is hydrogen. In various embodiments, fill fluid 524 is an azeotrope of carbon dioxide. In various embodiments, fill fluid 524 is an azeotrope of hydrogen.

Figure 6:
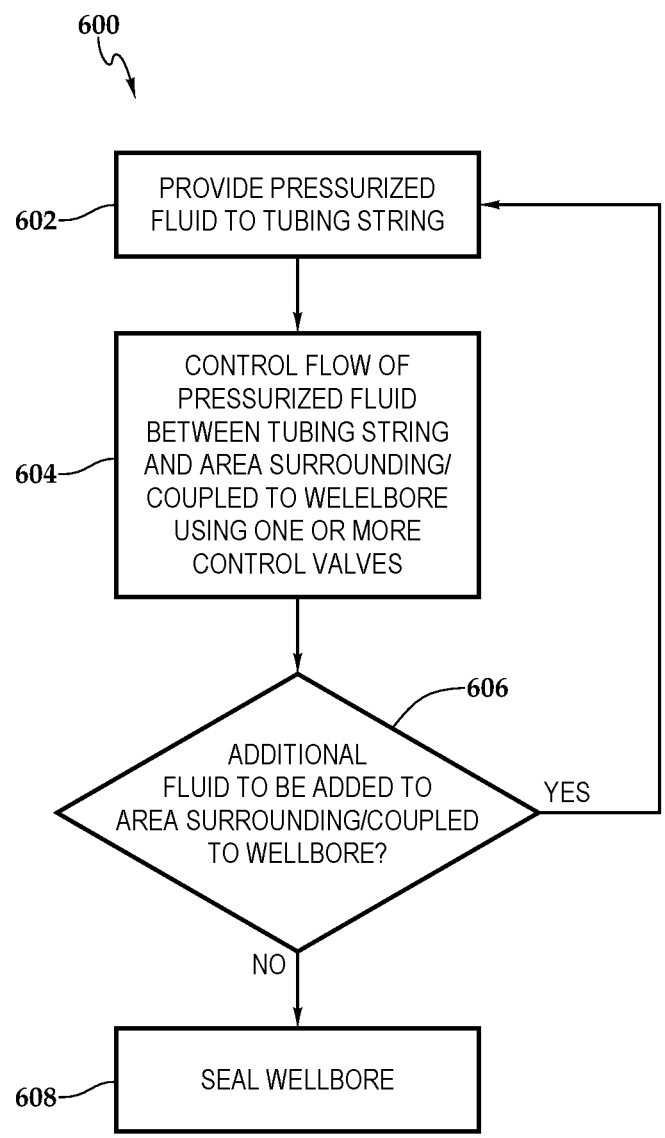
FIG. 6 illustrates a flowchart depicting a method for wellbore fluid injection operations using a flow control valve, according to various embodiments.

FIG. 6 illustrates a flowchart depicting a method 600 for wellbore fluid injection operations using a flow control valve, according to various embodiments. Embodiments of method 600 may be performed by a wellbore system, such as wellbore system 100, 160, and 170 as illustrated and described above with respect to FIGS. 1A, 1B and 1C.

Embodiments of method 600 include providing a pressurized fluid to a tubing string extending downhole within a wellbore (block 602). Providing the fluid may include drawing the fluid from a storage vessel located on a surface above and proximate to the wellbore. In various embodiments, providing the fluid may include using a fluid pump to move the fluid from the vessel to a wellhead positioned over the wellbore. In various embodiments, the fluid pump is controllable, in some embodiments using a processor based controller, to provide the fluid to the wellhead within or at a predefined fluid pressure. In various embodiments, the fluid pump includes or is coupled to work in conjunction with one or more temperature control devices configured to adjust and/or control the temperature of the fluid being provided by the fluid pump to the wellhead. In various embodiments, the wellhead includes one or more fluid control valves, wherein method 600 includes operating the one or more control valves to control the flow of fluid provided by the fluid pump to the tubing string. In various embodiments, providing the pressurized fluid to the tubing string includes controlling the temperature and/or the pressure of the fluid in order to provide the pressurized fluid to the tubing string in a desired phase state for injection or storage of the fluid in a subterranean formation. In various examples, the fluid being delivered to the tubing string is carbon dioxide, and the desired phase state of the carbon dioxide being delivered to the tubing string is a high density fluid phase. In various examples, the fluid being delivered to the tubing string is hydrogen, and the desired phase state of the hydrogen being delivered to the tubing string is a high density fluid phase.

Embodiments of method 600 include controlling a flow of the pressurized fluid between the tubing string and an area surrounding or coupled to the wellbore using one or more vapor-transition flow control valves (block 606). In various embodiments, the one or more vapor-transition flow control valves may be one or more, or a combination of, the flow control valves as described throughout this disclosure, and any equivalents thereof. In various embodiments, the one or more vapor-transition flow control valves include a valve chamber including a fill fluid comprising carbon dioxide or an azeotrope of carbon dioxide, and are configured to expand and contract a bellows enclosing the valve chamber and the fill fluid based on the transition of a phase of the fill fluid between a high density phase state to a low density phase state. In various embodiments, the vapor-transition flow control valves having the fill fluid comprising carbon dioxide or an azeotrope of carbon dioxide is configured to actuate to an open position, and thereby allow a flow of pressurized fluid comprising carbon dioxide to occur between the tubing string and the area surrounding and/or coupled to the wellbore only when the carbon dioxide provided by the tubing string is in a desired phase state.

In various embodiments, the one or more vapor-transition flow control valves include a valve chamber including a fill fluid comprising hydrogen or an azeotrope of hydrogen, and are configured to expand and contract a bellows enclosing the valve chamber and the fill fluid based on the transition of the phase of the fill fluid between a high density phase state to a low density phase state. In various embodiments, the vapor-transition flow control valves having the fill fluid comprising hydrogen or an azeotrope of hydrogen are configured to actuate to an open position, and thereby allow a flow of pressurized fluid comprising hydrogen to occur between the tubing string and the area surrounding and/or coupled to the wellbore only when the hydrogen provided by the tubing string is in a desired phase state.

Embodiments of method 600 include determining whether additional fluid is to be added to the area surrounding and/or coupled to the wellbore (decision block 606). If additional fluid is to be added to the area surrounding and/or coupled to the wellbore ("YES" branch extending from decision block 606), method 600 returns to block 602, which includes providing (additional) pressurized fluid to the tubing string. In various embodiments, the process of adding additional fluid may be performed on a continuous basis, or in incremental steps, with a pause in time between the additions of pressurized fluid to the tubing string where no additional fluid is being provided to the tubing string. The number of incremental steps that may be included in method 600 is not limed to any particular number of iterations, and is not limited to occurring over a particular time limit.

In various embodiments of method 600, if additional fluid is not to be added to the area surrounding and/or coupled to the wellbore ("NO" branch extending from decision block 606), method 600 proceeds to block 608, including sealing the wellbore. In various embodiments, sealing the wellbore may include withdrawing the tubing string from the wellbore. In various movements, sealing the wellbore may include actuating one or more sealing devices, such as sealing sleeves, which cover and seal the perforation that may have been used to allow the pressurized fluid provided through the tubing string to exit the casing of wellbore.

In embodiments of method 600, sealing the wellbore may include provide a seal at the wellhead positioned at the surface of the wellbore. In various embodiments, sealing the wellbore may include sealing the wellbore with a removable or actuatable seal that, when removed or actuated, allows access to the wellbore for the purpose of adding additional fluid to the area surrounding and/or coupled to the wellbore. In various embodiments, one or more alternative fluid pathways may be provided that are in fluid communication with the area surrounding and/or coupled to the wellbore, the alternate fluid pathway(s) configured to allow for controlled extraction of the fluid added to the area surrounding and/or coupled to the wellbore as a result of the execution of method 600.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein. The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

Embodiments include the following:

Embodiment 1. An apparatus comprising: a flow control valve configured to be positioned downhole in a wellbore and to control a flow of an injection fluid from a fluid conduit into a subterranean formation, the injection fluid comprising carbon dioxide; wherein the flow control valve comprises a chamber having a variable volume and filled with a fill fluid comprising carbon dioxide or an azeotrope of carbon dioxide, and wherein the flow control valve is configured to actuate to an open configuration to provide a fluid passageway for the injection fluid to flow from the fluid conduit into the subterranean formation when a phase state of carbon dioxide provided as the injection fluid to the flow control valve is in a predetermined phase state.

Embodiment 2. The apparatus of claim 1, wherein the predetermined phase state is a high density fluid phase state.

Embodiment 3. The apparatus of embodiments 1 or 2, wherein the subterranean formation comprises one or more layers of porous rock.

Embodiment 4. The apparatus of any one of embodiments 1-3, wherein the chamber includes a biasing device configured to apply a biasing force on one or more portions of the chamber to reduce a pressure level present in the fill fluid.

Embodiment 5. The apparatus of embodiment 4, wherein the biasing device is a bellows that encloses at least some portion of the chamber and the fill fluid.

Embodiment 6. The apparatus of embodiment 4, wherein the biasing device is a spring positioned within the chamber.

Embodiment 7. The apparatus of any one of embodiments 1-6, wherein the flow control valve comprises an end cap configured to form a fluid seal with and to block an opening when the flow control valve is actuated to a closed position, the opening included as a portion of the fluid passageway between the fluid conduit and the subterranean formation.

Embodiment 8. The apparatus of any one of embodiments 1–4 or 6, further comprising: a movable piston coupled to the chamber, wherein the movable piston is configured to actuate to the open configuration and to open the fluid passageway through an interior space of the flow control valve when a phase state of the carbon dioxide provided as the injection fluid to the flow control valve is in the predetermined phase state, and wherein the movable piston is configured to actuate to a closed configuration and to block the fluid passageway through the interior space of the flow control valve when the phase state of the carbon dioxide provided as the injection fluid to the flow control valve is not in the predetermined phase state.

Embodiment 9. An apparatus comprising: a flow control valve configured to be positioned downhole in a wellbore and to control a flow of an injection fluid from a fluid conduit into a subterranean formation, the injection fluid comprising hydrogen; wherein the flow control valve comprises a chamber having a variable volume and filled with a fill fluid comprising hydrogen or an azeotrope of hydrogen, and wherein the flow control valve is configured to actuate to an open configuration to provide a fluid passageway for the injection fluid to flow from the fluid conduit into the subterranean formation when a phase state of hydrogen provided as the injection fluid to the flow control valve is in a predetermined phase state.

Embodiment 10. The apparatus of embodiment 9, wherein the predetermined phase state is a high density fluid phase.

Embodiment 11. The apparatus of embodiments 9 or 10, wherein the subterranean formation comprises an open cavity located within the subterranean formation.

Embodiment 12. The apparatus of any one of embodiments 9-11, wherein the chamber includes a biasing device configured to apply a biasing force on one or more portions of the chamber to reduce a pressure level present in the fill fluid.

Embodiment 13. The apparatus of embodiment 12, wherein the biasing device is a bellows that encloses at least some portion of the chamber and the fill fluid.

Embodiment 14. The apparatus of embodiment 12, wherein the biasing device is a spring positioned within the chamber.

Embodiment 15. The apparatus of any one of embodiments 9-14, wherein the flow control valve comprises an end cap configured to form a fluid seal with and to block an opening when the flow control valve is actuated to a closed position, the opening included as a portion of the fluid passageway between the fluid conduit and the subterranean formation.

Embodiment 16. The apparatus of any one of embodiments 9-12 or 14, further comprising: a movable piston coupled to the chamber, wherein the movable piston is configured to actuate to the open configuration and to open the fluid passageway through an interior space of the flow control valve when a phase state of hydrogen provided as the injection fluid to the flow control valve is in the predetermined phase state, and wherein the movable piston is configured to actuate to a closed configuration and to block the fluid passageway through the interior space of the flow control valve when the phase state of hydrogen provided to as the injection fluid to the flow control valve is not in the predetermined phase state.

Embodiment 17. A method comprising: providing an injection fluid to a fluid conduit extending downhole into a wellbore; controlling a flow of the injection fluid between the fluid conduit and a subterranean formation surrounding or coupled to the wellbore using one or more flow control valves; wherein each of the one or more flow control valves comprises a chamber having a variable volume and filled with a fill fluid, wherein the fill fluid comprises carbon dioxide or an azeotrope of carbon dioxide when the injection fluid to be controllably injected into the subterranean formation is carbon dioxide, and wherein the fill fluid comprises hydrogen or a azeotrope of hydrogen when the injection fluid to be controllably injected into the subterranean formation is hydrogen, and wherein each of the one or more flow control valves is configured to actuate to an open configuration to provide a fluid passageway for the injection fluid to flow from the fluid conduit into the subterranean formation when a phase state of the injection fluid is provided to the flow control valve is in a predetermined phase state.

Embodiment 18. The method of embodiment 17, wherein the subterranean formation comprises one or more layers of porous rock when the injection fluid is carbon dioxide, and wherein the subterranean formation comprises an open cavity when the injection fluid is hydrogen.

Embodiment 19. The method of embodiments 17 or 18, wherein the predetermined phase state is a high density fluid phase when the injection fluid is carbon dioxide.

Embodiment 20. The method of embodiments 17 or 18, wherein the predetermined phase state is a high density fluid phase when the injection fluid is hydrogen.

Embodiment 21, An apparatus comprising: a flow control valve configured to be positioned downhole in a wellbore and to control a flow of an injection fluid from a fluid conduit into a subterranean formation, the injection fluid comprising carbon dioxide or hydrogen; wherein the flow control valve comprises a chamber having a variable volume and filled with a fill fluid comprising carbon dioxide or an azeotrope of carbon dioxide, when the fluid to be injected is carbon dioxide, and wherein the flow control valve comprises the chamber filled with a fluid comprising hydrogen or an azeotrope of hydrogen, and wherein the flow control valve is configured to actuate to an open configuration to provide a fluid passageway for the injection fluid to flow from the fluid conduit into the subterranean formation when a phase state of the injection fluid is provided in a high density fluid phase.

What is claimed is:

1. An apparatus comprising:
   a flow control valve configured to be positioned downhole in a wellbore and to control a flow of an injection fluid from a fluid conduit into a subterranean formation, the injection fluid comprising elemental hydrogen ($H_2$);
   wherein the flow control valve comprises a chamber having a variable volume and filled with a fill fluid comprising elemental hydrogen ($H_2$) or an azeotrope of elemental hydrogen, and wherein the flow control valve is configured to actuate to an open configuration to provide a fluid passageway for the injection fluid to flow from the fluid conduit into the subterranean formation when a phase state of the elemental hydrogen ($H_2$) provided as the injection fluid to the flow control valve is in a predetermined phase state.

2. The apparatus of claim 1, wherein the predetermined phase state is a high density fluid phase.

3. The apparatus of claim 1, wherein the subterranean formation comprises an open cavity located within the subterranean formation.

4. The apparatus of claim 1, wherein the chamber includes a biasing device configured to apply a biasing force on one or more portions of the chamber to reduce a pressure level present in the fill fluid.

5. The apparatus of claim 4, wherein the biasing device is a bellows that encloses at least some portion of the chamber and the fill fluid.

6. The apparatus of claim 4, wherein the biasing device is a spring positioned within the chamber.

7. The apparatus of claim 1, wherein the flow control valve comprises an end cap configured to form a fluid seal with and to block an opening when the flow control valve is actuated to a closed position, the opening included as a portion of the fluid passageway between the fluid conduit and the subterranean formation.

8. The apparatus of claim 1, further comprising:
a movable piston coupled to the chamber,
wherein the movable piston is configured to actuate to the open configuration and to open the fluid passageway through an interior space of the flow control valve when a phase state of hydrogen provided as the injection fluid to the flow control valve is in the predetermined phase state, and
wherein the movable piston is configured to actuate to a closed configuration and to block the fluid passageway through the interior space of the flow control valve when the phase state of hydrogen provided to as the injection fluid to the flow control valve is not in the predetermined phase state.

9. A method comprising:

providing an injection fluid to a fluid conduit extending downhole into a wellbore, the injection fluid comprising elemental hydrogen ($H_2$);

controlling a flow of the injection fluid between the fluid conduit and a subterranean formation surrounding or coupled to the wellbore using one or more flow control valves;

wherein each of the one or more flow control valves comprises a chamber having a variable volume and filled with a fill fluid, wherein the fill fluid comprises elemental hydrogen ($H_2$) or an azeotrope of elemental hydrogen, and wherein each of the one or more flow control valves is configured to actuate to an open configuration to provide a fluid passageway for the injection fluid to flow from the fluid conduit into the subterranean formation when a phase state of the injection fluid is provided to the flow control valve is in a predetermined phase state.

10. The method of claim 9, wherein the subterranean formation comprises an open cavity located within the subterranean formation.

11. The method of claim 9, wherein the predetermined phase state is a high density fluid phase of elemental hydrogen ($H_2$).

12. The method of claim 9, wherein the one or more flow control valves comprise a plurality of flow control valves, wherein each of the plurality of flow control valves are spaced apart from one another along the wellbore and are surrounded by a respective portion of an annulus which is separated into isolated sections of the annulus by packers.

* * * * *